(12) United States Patent
Schneider

(10) Patent No.: US 12,726,363 B1
(45) Date of Patent: Sep. 1, 2026

(54) SYSTEM, METHOD, PRODUCT, AND APPARATUS FOR AUTONOMOUS TRANSACTION INITIATION VIA UNPROMPTED MACHINE-READABLE SIGNALS

(71) Applicant: Eric Schneider, Hallandale Beach, FL (US)

(72) Inventor: Eric Schneider, Hallandale Beach, FL (US)

( * ) Notice: Subject to any disclaimer, the term of this patent is extended or adjusted under 35 U.S.C. 154(b) by 0 days.

(21) Appl. No.: 19/553,185

(22) Filed: Feb. 27, 2026

(51) Int. Cl.
*H04L 9/32* (2006.01)
*H04L 9/08* (2006.01)

(52) U.S. Cl.
CPC .......... *H04L 9/3247* (2013.01); *H04L 9/0894* (2013.01)

(58) Field of Classification Search
CPC ..... H04L 9/3247; H04L 9/0894; H04L 67/51; G06K 5/00; G06Q 20/20; G06Q 20/202; G06Q 30/0613; H04W 12/35; H04W 12/06; H04W 12/08; H04W 12/72; H04W 4/80; H04W 4/00; H04W 8/005; H04W 48/08; H04W 76/10
See application file for complete search history.

(56) References Cited

U.S. PATENT DOCUMENTS 8,612,604 B2 12/2013 Beatty et al.
9,374,666 B1 6/2016 Trouw et al.
9,928,536 B2 3/2018 Fernandez
10,217,151 B1 2/2019 Greiner et al.
10,278,041 B2 4/2019 Wesby
10,509,924 B2 * 12/2019 Smith .................... G06Q 20/20
10,536,678 B2 1/2020 Anders et al.
10,586,251 B2 3/2020 Fernandez
11,589,321 B2 2/2023 Mandutz et al.
11,871,237 B1 * 1/2024 Han .................... H04B 17/318
11,961,107 B2 4/2024 Patel
(Continued)

OTHER PUBLICATIONS

Eric Schneider; "System, Method, Product, and Device for Hardware Sequestration and Atomic State-Modification of Discrete-State Data Objects"; U.S. Appl. No. 19/558,312; filed Mar. 5, 2026.
(Continued)

*Primary Examiner* — William A Corum, Jr.

(57) ABSTRACT

A mobile computing device, an electronic receiving device, and a system for autonomous, unprompted transaction initiation are disclosed. The mobile initiator is configured to generate a signed data payload containing a public key and selectable data attributes, outputting them as a machine-readable signal. Crucially, this signal is initiated by the mobile device independently of any prior data-modulated signal from an external receiver. The electronic receiving device monitors for this unprompted signal, verifies it using the public key, and modifies its operational state accordingly. Disclosed embodiments include hybrid and concurrent processing architectures where devices maintain persistent dual-states to support both traditional terminal-initiated polling and autonomous mobile-initiated handshakes. By decoupling the transaction sequence from legacy interrogation signals, the system enables spatial, unprompted commercial negotiations and secure state transitions anchored by cryptographic verification and unique identifiers.

27 Claims, 16 Drawing Sheets

(56) References Cited

U.S. PATENT DOCUMENTS

| | | | | |
|---|---|---|---|---|
| 12,332,366 | B2 | 6/2025 | Ertan et al. | |
| 2002/0147984 | A1 | 10/2002 | Tomsen et al. | |
| 2014/0359723 | A1 | 12/2014 | Hake et al. | |
| 2016/0066137 | A1* | 3/2016 | Kulkarni | G01S 5/02213 455/456.1 |
| 2016/0127938 | A1* | 5/2016 | Yoon | H04W 4/80 370/252 |
| 2017/0255923 | A1 | 9/2017 | Dieter et al. | |
| 2024/0388925 | A1* | 11/2024 | Darwish | H04W 16/26 |

OTHER PUBLICATIONS

Eric Schneider; "System, Method, Product, and Apparatus for Discrete Payload Object Provisioning and Attested Sequestration Confirmation Generation"; U.S. Appl. No. 19/567,209, filed Mar. 15, 2026.

Eric Schneider; "System, Method, Product, and Apparatus for the Ledger Lifecycle of Attested Sequestration States"; U.S. Appl. No. 19/635,628, filed Mar. 31, 2026.

Eric Schneider; "System, Method, Product, and Apparatus for Hardware-Node Lifecycle and Lineage Management"; U.S. Appl. No. 19/639,199, filed Apr. 4, 2026.

Eric Schneider; "System, Method, Product, and Apparatus for Hardware-Attested Data Aggregation, Dynamic Liquidity Balancing, and Autonomous Settlement"; U.S. Appl. No. 19/643,030, filed Apr. 9, 2026.

* cited by examiner

SYSTEM, METHOD, PRODUCT, AND APPARATUS FOR AUTONOMOUS TRANSACTION INITIATION VIA UNPROMPTED MACHINE-READABLE SIGNALS

FIELD OF THE DISCLOSURE

The present disclosure relates generally to unprompted machine-to-machine commercial signaling and cryptographic negotiation. Specifically, the disclosure relates to an electronic receiving device and system configured to dynamically arbitrate between passive target polling and active, unprompted machine-readable signals to modify an operational state.

BACKGROUND OF THE DISCLOSURE

Short-range data exchange is defined by a persistent synchronous bottleneck. Early proximity systems, from magnetic stripe to contact-based smart cards, established a rigid "Master-Slave" hierarchy where a stationary terminal acts as the primary controller, supplying the energy or clock signal required for data transfer. This precedent created a global infrastructure where the secondary device (e.g., a mobile phone) remains essentially invisible to the environment until it is physically "prompted" or interrogated by a terminal.

Despite the shift to Near Field Communication (NFC), RFID, and optical scanning (e.g., QR code polling), proximity technologies remain anchored to this reactive logic. Standard contactless protocols rely on a polling loop mechanism, wherein a reader typically energizes an RF field or a visual sensor array to "search" for a compatible target. Communication cannot begin until the reader identifies a device and initiates a handshake or a focal-lock. This forces modern mobile devices into a state of passive latency, where they are traditionally configured to wait for the environment to "wake them up," facilitating a delay in the establishment of a communication carrier before the terminal-led interrogation begins.

This "Terminal-First" topology introduces significant real-world friction across multiple modalities. In high-throughput environments—such as transit hubs or secure access points—legacy systems often require precise synchronization between the user's gesture and the machine's polling cycle. If a terminal is busy or in a "sleep" state, the interaction may fail or experience lag. Furthermore, because traditional architectures are optimized for the receiver's infrastructure, there is no universal mechanism for a mobile device to autonomously signal its presence or operational state to the environment in an unprompted fashion. This "interrogation-dependency" creates a fundamental barrier to autonomous operation, as the mobile device is prevented from establishing an active emission posture until after it has been captured by the terminal's field.

Accordingly, in light of the above, there is a need for a communication architecture that enables the emission of machine-readable data independently of a receiver-led polling field.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY OF THE DISCLOSURE

The present disclosure is directed to systems, devices, and methods for facilitating autonomous and unprompted proximity-based interactions through a decentralized communication architecture. At its core, the disclosure provides a mobile computing device capable of initiating transactions independently of an external interrogation field by outputting a machine-readable signal comprising a cryptographically signed data payload and a selectable data attribute. Complementary to this initiator, an electronic receiving device is configured to monitor for these unprompted signals, verify their authenticity via a public key, and modify its operational state based on the transmitted attributes without requiring a prior polling sequence. The disclosure further encompasses hybrid and concurrent processing environments where both the mobile initiator and the receiving device manage multiple operational modes—such as legacy passive transponder emulation, active polling, and unprompted signal detection—either through dynamic state transitions or via persistent dual-state processing. By enabling both mobile-initiated and terminal-initiated handshakes, the system ensures seamless, low-latency commercial negotiations and configuration adjustments that remain functional regardless of external network availability or the presence of legacy proximity protocols.

In one aspect a mobile computing device for autonomous transaction initiation includes a non-transitory memory storing a private cryptographic key and at least one selectable data attribute and a processor configured to generate a data payload comprising the selectable data attribute and a public key associated with the private cryptographic key and generate a digital signature via application of the private cryptographic key to the data payload and command a signal output interface to output the data payload and the digital signature as a machine-readable signal wherein the machine-readable signal is initiated by the mobile computing device and is independent of any data-modulated signal received from an external receiver.

In another aspect an electronic receiving device for unprompted configuration includes a detection interface configured to monitor for an unprompted machine-readable signal containing a public key and at least one selectable data attribute and a processor configured to verify the unprompted machine-readable signal via application of the public key and modify an operational state of the electronic receiving device based on the selectable data attribute wherein the modification of the operational state is contingent upon the unprompted machine-readable signal and is independent of any data-modulated signal transmitted by the electronic receiving device to an external device.

In a further aspect a system for unprompted commercial negotiation includes a mobile initiator and an electronic receiving device where the mobile initiator includes a signal output interface configured for initiation of an unprompted machine-readable signal comprising a public key a selectable data attribute and a unique identifier and the electronic receiving device is configured to verify the unprompted machine-readable signal via application of the public key and modify an operational state based on the selectable data attribute and transmit a response signal comprising a cryptographic binding to the unique identifier wherein the unprompted machine-readable signal is initiated by the mobile initiator independently of any data-modulated signal from the electronic receiving device.

In yet another aspect an electronic receiving device for hybrid transaction processing includes a detection interface and a processor where the processor is configured to maintain the electronic receiving device in a first mode for transmission of a polling signal and for monitoring for a response from a passive target and maintain the detection interface in a second mode for monitoring for an unprompted machine-readable signal containing a public key and at least one selectable data attribute and switch from the first mode to the second mode upon detection of the unprompted machine-readable signal and verify the unprompted machine-readable signal via application of the public key and modify an operational state of the electronic receiving device based on the selectable data attribute.

In a following aspect an electronic receiving device for concurrent transaction processing includes a detection interface and a processor where the processor is configured to maintain the detection interface in a persistent dual-state including a polling state and an unprompted signal detection state and identify via the unprompted signal detection state an unprompted machine-readable signal containing a public key and at least one selectable data attribute and verify the unprompted machine-readable signal via application of the public key and modify an operational state of the electronic receiving device based on the at least one selectable data attribute wherein the polling state and the unprompted signal detection state are active concurrently.

In an additional aspect a mobile computing device for hybrid transaction initiation includes a non-transitory memory storing a private cryptographic key and at least one selectable data attribute and a signal output interface and a processor configured to maintain a first operating state for initiation of an unprompted machine-readable signal via the signal output interface where the unprompted machine-readable signal includes a public key and the selectable data attribute and maintain a second operating state for response to a data-modulated interrogation signal from an external receiver and transition between the first operating state and the second operating state based on a power-management profile wherein the unprompted machine-readable signal is initiated by the mobile computing device independently of any signal from the external receiver.

In another aspect a mobile computing device for concurrent transaction initiation includes a non-transitory memory storing a private cryptographic key and at least one selectable data attribute and a signal output interface and a processor configured to operate the signal output interface in a first mode for initiation of an unprompted machine-readable signal including a public key and the selectable data attribute and operate the mobile computing device in a second mode for transmission of a response signal only subsequent to detection of a data-modulated interrogation signal from an external receiver wherein the first mode and the second mode are managed concurrently by the processor to enable both mobile-initiated and terminal-initiated handshakes.

In accordance with additional aspects of the present disclosure, there are provided various methods, apparatuses, systems, and non-transitory computer-readable media that implement the functionality described herein. It is expressly contemplated that any functional step described in relation to a method shall find corresponding support as a structural component of an apparatus or system, and any structural feature described as part of an apparatus or system shall find corresponding support as a step in a method of operation. Specifically, the disclosure provides an apparatus and system configured to implement the functionality of the methods described above, as well as a non-transitory computer-readable medium comprising instructions that, when executed by a processor, cause the processor to perform said methods and realize the technical objectives of the recited apparatuses.

The present disclosure provides a mobile computing device that eliminates the latency associated with traditional polling cycles by independently initiating a machine-readable signal to trigger autonomous transaction processing. The present disclosure enables an electronic receiving device to passively monitor for unprompted signals, thereby reducing electromagnetic noise and power consumption associated with continuous interrogation fields. The present disclosure establishes a secure negotiation framework where a receiving device provides a cryptographic binding to a unique identifier, ensuring that unprompted transactions are anchored to a specific, verified interaction session.

The present disclosure facilitates hybrid transaction processing by allowing a receiver to maintain legacy compatibility with passive targets while dynamically switching to a secondary mode to ingest high-value unprompted data attributes. The present disclosure optimizes terminal throughput by utilizing a persistent dual-state detection interface that concurrently manages active polling and unprompted signal capture without inter-state switching delays. The present disclosure provides a robust interference mitigation architecture that allows for the simultaneous verification of public keys and the modification of operational states in a high-density signal environment.

The present disclosure introduces a power-efficient mobile architecture that transitions between broadcast and response states based on a local power-management profile to maximize battery longevity during proximity interactions. The present disclosure ensures universal interoperability by managing concurrent mobile-initiated and terminal-initiated handshakes, allowing the device to adapt its communication strategy based on the capabilities of the proximate receiver. The present disclosure preserves user privacy and data integrity by utilizing locally stored private keys to generate ephemeral digital signatures, ensuring that transaction initiation remains secure even in the absence of external network connectivity.

The foregoing and other features of the present disclosure are hereinafter fully described and particularly pointed out in the claims. The following description and the annexed drawings set forth in detail one or more illustrative aspects of the disclosure, such being indicative, however, of but one or a few of the various ways in which the principles of the described embodiments and their equivalents may be employed.

DETAILED DESCRIPTION OF THE DISCLOSURE

Figure 1:
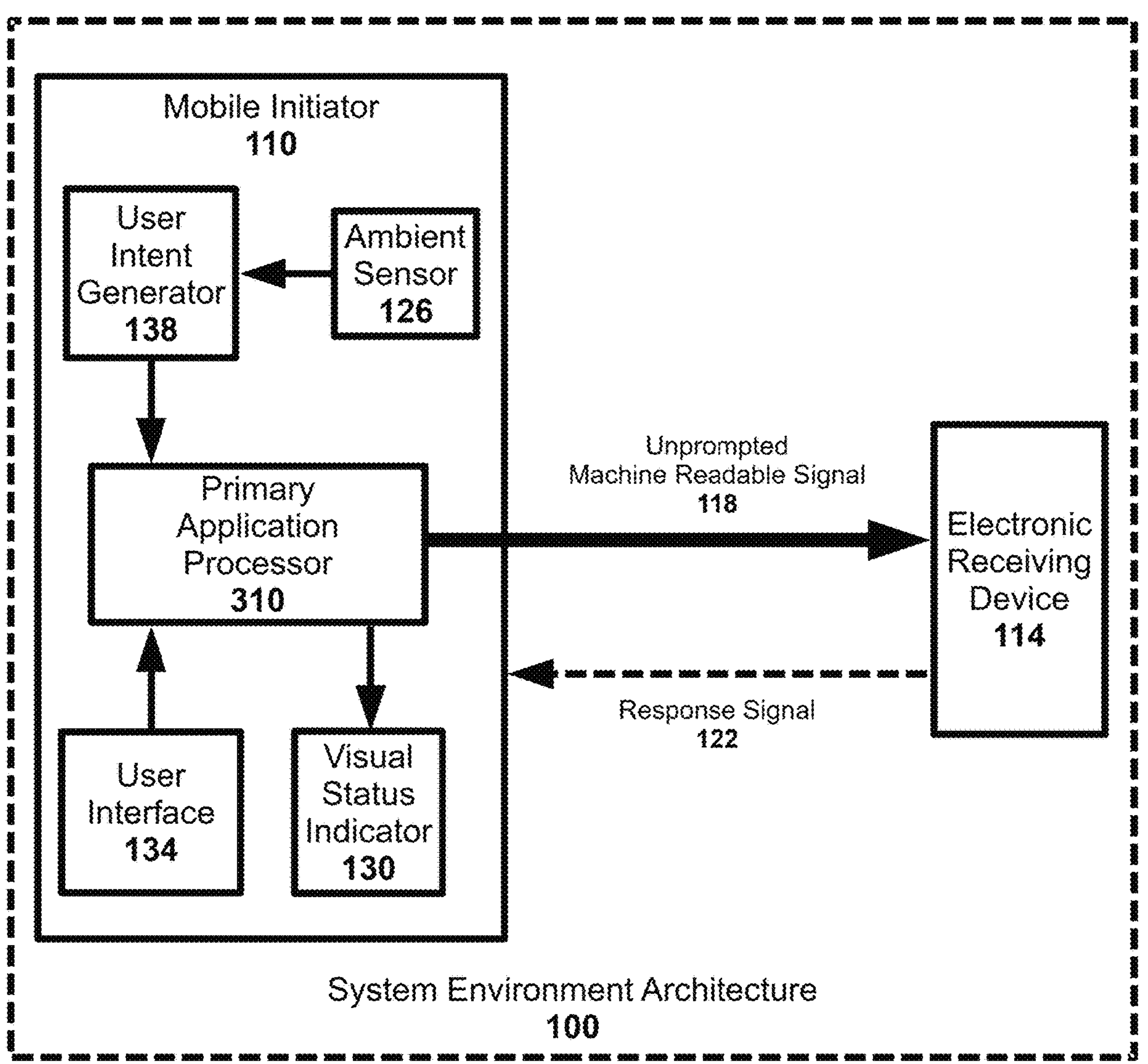
FIG. 1 is a functional block diagram of the overall system environment architecture in accordance with the present disclosure.

The present disclosure will now be described with reference to the drawings, wherein like reference numerals are used to refer to like elements disclosed herein.

For the purposes of the present disclosure, the following technical terms and phrases are to be interpreted according to the specific definitions and functional requirements set forth below, notwithstanding any broader or more generic usage found in external dictionaries or industry standards.

To facilitate a broad understanding of the physical signal layer, an actively generated unprompted magnetic field generally refers to a magnetic flux produced by a device using an internal power source and an inductive element to establish a communication carrier entirely independently of an interrogation field from an external reader. This is typically achieved using a broadly defined magnetic field generator or an active NFC controller capable of operating autonomously. In instances where an external carrier is already present, the device may transition to a legacy-compatible state wherein active load modulation is utilized to synthesize a signal that emulates a backscatter response through active transmission rather than passive reflection. These emissions are handled by a signal output interface capable of outputting machine-readable signals. Such signals may take the form of an asynchronous non-polled broadcast waveform transmitting data without a prior bidirectional handshake, and may include a one-way preamble sequence as an integral part of the unprompted emission to synchronize a receiving device via a low-power hardware interrupt. This unprompted emission is further characterized by a pre-initiation phase, representing a discrete operational phase of the mobile initiator occurring entirely within a partitioned secure processing environment, characterized by the autonomous selection of a data attribute and the generation of a temporal entropy element prior to the transitioning of the signal output interface to an active broadcast state. To manage computational resources, dedicated hardware such as a direct memory access controller or a hardware-based random number generator can be employed to manage data transfers and provide physical entropy streams respectively, thereby minimizing overhead on the primary application processing units.

On the receiving end, an electronic receiving device generally refers to a hardware assembly comprising a detection interface and processing logic, encompassing stationary terminals, handheld devices, and distributed responsive nodes or headless transponders (beacons) integrated into environmental infrastructure. Maintaining system responsiveness often involves a persistent dual-state, which broadly describes a concurrent operational mode where a processor maintains both a polling sequence and a passive listening sequence simultaneously without temporal switching delays. To isolate external signals during this concurrent operation, active self-interference cancellation may be employed using analog or digital processing to neutralize local transmission leakage within the reception path, or in optical embodiments, through the application of ambient luminance filtering. This architecture can be facilitated by a software-defined radio front-end allowing for digital domain partitioning or physical elements like a galvanic isolation barrier to prevent signal saturation. Further interference mitigation logic includes adaptive carrier-cancellation circuitry (e.g., dynamic gain control or adaptive notch filtering) configured to selectively attenuate the high-amplitude carrier wave of legacy polling while amplifying the low-amplitude sideband modulations of the unprompted signal. In the event of unresolvable signal collisions or sensor saturation, the system may enter a temporary blanking state to safely suspend data processing and prevent memory corruption or, conversely, lock onto a specific transmission using a high-sensitivity signal-capture state.

Cryptographic and identity operations rely on high-security hardware generally referred to as a secure element hardware module or a partitioned secure processing environment designed to execute sensitive operations in physical isolation from general operating systems. Within this environment, a persistent identity or private root identity key can be maintained across multiple sessions. To protect user privacy during transient interactions, these persistent identifiers are often substituted with an anonymized token or a zero-knowledge proof token, allowing a device to demonstrate the mathematical validity of a statement without revealing underlying personal data. A data attribute specifically refers to a computationally-derived, mutable payload generated by the processor based on an internal device state; this is expressly distinguished from static hardware identifiers or network-layer addresses, which lack the semantic agency to trigger local operational state modifications without external server lookups. These tokens and attributes can be bound to prior transactional seeds to establish a verifiable identity chain. When a negotiation concludes, the interaction is secured via a cryptographic binding that mathematically links a response signal to a session-specific unique identifier. The system may also utilize a recovery key to safely re-establish this binding following a reset or issue a transaction-finality token to serve as an immutable digital receipt. Furthermore, a differential privacy noise parameter can be injected into local analytics buffers to ensure mathematical anonymity across aggregated terminal data.

To determine physical intent, the system employs spatial analytics such as a velocity-of-approach model, representing a calculation of relative closing speeds and distances based on the rate of change of received signal metrics over time. This data directly informs a temporal transaction window representing the dynamic interval during which a transaction remains valid. Devices rely on a proximal threshold representing a predefined spatial, pixel-density, or signal-strength boundary to trigger operational state transitions. Movement and spatial orientation can be further refined using a received signal strength indicator gradient, pixel-density gradient analysis, angle-of-arrival calculations across multi-element antenna arrays, or precise distance measurements utilizing time-of-flight ranging protocols. The physicality oracle refers to a hardware-software bridge configured to cross-verify spatial attestation metadata with environmental sensor telemetry (e.g., PIR or UWB) for verification of initiator presence. Engagement is further facilitated by a user interface controller managing a haptic actuator to provide tactile orientation vectors or feedback to the user. The timing of these operational state transitions may be governed by a dynamic power-management profile comprising local logic rules and thermal limits to optimize energy availability during proximity interactions. To prevent logic deadlocks, an ambient sensor (initiator-side) is configured to trigger an unprompted broadcast based on internal intent (e.g., user motion), while an ambient sensor (receiver-side) acts as a hardware gatekeeper to wake parsing logic only upon external physical presence.

The logical handling of these interactions is driven by autonomous execution logic, allowing a mobile device to complete transactions locally without requiring real-time external network connectivity. Transaction parameters are bundled into a negotiation manifest outlining acceptable terms, which may include an ultimatum flag signifying a strictly non-negotiable constraint and an ultimatum requirement representing the benchmark for validation. Data selection is governed by a user preference profile, which automatically selects which data attributes, such as a persona-specific attribute comprising a discrete bit-string or token, to include in the signal. The manifest further incorporates an attribute reconciliation table, comprising a bit-map correlating non-PII data attributes with numerical discount weights or value-exchanges. Multiple user preferences and identity tokens can be aggregated into a unified transactional persona for broadcast and subsequently parsed into a unified transaction manifest by the receiver to process composite requests. When overlapping or concurrent requests occur, sequential settlement logic manages the queue utilizing reconciliation buffers to seamlessly align data fragments before merging. If a verification requirement is only partially met, the receiving device may calculate a local risk score based on environmental metadata and execute a graceful degradation protocol to maintain limited functionality.

Integration with external commercial ecosystems is further facilitated by a merchant management system, which generally refers to a remote or local server comprising a database and communication interface configured to orchestrate inventory updates and pricing rules. Financial finality is achieved through a financial clearing network, representing a secure telecommunications infrastructure linking banking institutions for fund movement or credit authorization. A payment gateway interface comprises a software module or API within the electronic receiving device that converts cryptographically bound response signals into standardized authorization requests for the financial network. Real-time availability data is provided to the receiving device via a local inventory database to inform counter-offer attributes. In some embodiments, an immutable record of the transaction-finality token is maintained on a third-party ledger, which may comprise a centralized bank database or a distributed ledger technology. Upon the occurrence of a subtotal event, the system generates a settlement instruction, representing a digital command that triggers the final financial discharge. Persistent transaction queue refers to an encrypted circular buffer configured to maintain negotiation states across power-interruptions. Finally, legacy compatibility is ensured by bridging modern data attributes through a legacy point-of-sale interface, optionally utilizing a legacy hardware bridge comprising a physical adapter or protocol translator to enable communication with older payment equipment.

To facilitate a similarly broad understanding of optical implementations, a machine-readable signal further encompasses a spatially-modulated optical pattern or an active luminance-modulated emission output via an electronic display or optical emitter. In this context, a spatially-modulated optical pattern refers to any arrangement of visual elements, such as a two-dimensional matrix barcode or a sequence of time-varying machine-readable codes, where data is encoded within the spatial or temporal distribution of light, and may further comprise a time-variant entropy component such that the pattern is unique to a specific temporal window. Active luminance modulation refers to the controlled variation of light intensity or color over time to embed a data payload within a visual field, detectable by an optical sensor even in the absence of a distinct geometric pattern. This is supported by a luminance sync-signal used to synchronize the refresh rate of an optical emitter with the shutter timing of a sensor. On the receiving end, an optical image sensor refers to any array of light-sensitive elements, such as a CMOS or CCD sensor, configured to capture these emissions within one or more image frames. When determining physical intent in the optical domain, a velocity-of-approach model utilizes pixel-density gradient analysis, representing a calculation of the rate of change in the number of pixels occupied by the optical signal across successive frames to estimate closing speed and proximity. A spatial intent score further qualifies this by measuring the vector alignment of the detected signal relative to the sensor's optical axis. Neural processing may further evaluate digital glare, representing specular reflection patterns used to differentiate a physical substrate from a digital reproduction. Finally, a cross-modal system refers to an architecture where the unprompted machine-readable signal and the subsequent response signal utilize different physical layers, managed by a processor maintaining a dual-state capable of concurrent visual and electromagnetic monitoring.

Having defined the technical terms and functional requirements above, the structural implementation and operative environment of these components will now be described with reference to the accompanying drawings. The following embodiments are provided as non-limiting examples intended to illustrate the principles of the disclosure rather than to restrict the scope of the claims.

Referring to FIG. 1, a System Environment Architecture 100 is illustrated for facilitating proximity-based, unprompted negotiation and state modification between a plurality of hardware nodes. The System Environment Architecture 100 provides a physical and logical framework for a Mobile Initiator 110 and an Electronic Receiving Device 114 to engage in an asynchronous data exchange. Unlike legacy systems that rely on a terminal-led polling loop to wake a passive target, the present architecture enables the Mobile Initiator 110 to proactively signal intent and operational constraints before a mutual handshake is established.

The Mobile Initiator 110 comprises a handheld or wearable computing device equipped with proactive field-generation circuitry and a Visual Status Indicator 130 (e.g., an interactive status interface) for providing real-time feedback to the user regarding the state of the negotiation. In a broad sense, the Mobile Initiator 110 functions as a proactive emitter that synthesizes and emits an Unprompted Machine-Readable Signal 118. This signal is self-powered and self-clocked, utilizing a System Clock 338 (see FIG. 3) to maintain temporal rhythm independent of external triggers. By way of example, the Mobile Initiator 110 may take the form of a smartphone, a tablet, or a specialized industrial transponder, utilizing the internal hardware partitioning managed by a Primary Application Processor 310 (see FIG. 3) and a Signal Output Interface 414 (see FIG. 4) to generate the physical emission. To ensure interference-free communication during optical or RF emissions, the signal may be synchronized via a Luminance Sync-Signal 450, ensuring the refresh rate of an Electronic Display 454 (see FIG. 4) matches the shutter timing of a remote sensor.

The Electronic Receiving Device 114 comprises terminal-side hardware, such as a point-of-sale (POS) terminal, a transit gate, a standalone information kiosk, a handheld mobile device, or a distributed responsive node. In nodal embodiments, device 114 may take the form of a smart beacon or transponder integrated into environmental fixtures, such as kiosks, shelving, or entry portals, functioning as a headless transceiver for unprompted interaction. The Electronic Receiving Device 114 is configured for passive listening, utilizing a Detection Interface 510 (see FIG. 5) that identifies the Unprompted Machine-Readable Signal 118. The Unprompted Machine-Readable Signal 118 is an active emission generated by the Mobile Initiator 110 independently of any polling or interrogation field from the Electronic Receiving Device 114. For instance, the signal may be emitted as an active magnetic flux via a Magnetic Field Generator 422, as a burst via a Software Defined Radio 418 (see FIG. 4), or as a spatially-modulated optical pattern via the Electronic Display 454 or LED Array 434. This signal carries a Negotiation Manifest 714 (see FIG. 7), which informs the Electronic Receiving Device 114 of the initiator's intent and required operational constraints as structured in the Data Payload 710 (see FIG. 7). While the disclosure is primarily defined by this proactive emission, certain embodiments may further include a Response Signal 122—a cryptographically bound confirmation or counter-offer—emitted by the Electronic Receiving Device 114 back to the Mobile Initiator 110 to extend the application's verification depth.

The System Environment Architecture 100 further includes an Ambient Sensor 126 residing on the initiator-side, which is communicatively coupled to the Primary Application Processor 310. In one implementation, the Ambient Sensor 126 is configured as an internal intent-detection gate comprising an IMU, PIR, or an optical image sensor that identifies environmental readiness. The input from the Ambient Sensor 126 provides a hardware-level gate for a User Intent Generator 138, which translates physical motion or spatial readiness into a data trigger. By combining the pre-authorized constraints from a User Interface 134 (represented in the Attribute Reconciliation Table 738) with the real-time triggers from the User Intent Generator 138, the Mobile Initiator 110 ensures the proactive "shout" is both human-anchored and spatially relevant. This allows for the selective emission of the Unprompted Machine-Readable Signal 118 when the Primary Application Processor 310 determines an internal intent (e.g., a "reach" motion toward a terminal) or identifies that a viable receiver is within a functional range.

From a conceptual perspective, the System Environment Architecture 100 facilitates a transition from "Reactive Interrogation" to "Proactive Environmental Signaling." This architecture addresses the latency and "discovery" bottlenecks of legacy proximity protocols by enabling the communication carrier to be established based on the initiator's determined intent. This proactive posture is managed by the Primary Application Processor 310, which synchronizes the emission of energy with the verified physical proximity and human intent, ensuring that the "unprompted" nature of the emission is balanced with the user's pre-defined commercial and privacy limits.

In a practical application, such as a Retail "Express Lane" Pairing, a user approaching a self-checkout kiosk does not need to manually engage their device or wait for a localized beacon to wake their phone. Instead, as the user enters the proximity of the kiosk, the Ambient Sensor 126 and User Intent Generator 138 detect the user's intentional movement and trigger the Mobile Initiator 110 to proactively emit a "Loyalty+Digital Receipt" intent. The Electronic Receiving Device 114 detects this signal via the Detection Interface 510, validates the intent, and wakes from a standby state to load the user's shopping profile. Following this unprompted exchange, the Visual Status Indicator 130 provides a local confirmation on the Mobile Initiator 110, ensuring the user is notified that the state modification was executed in accordance with the pre-authorized constraints established via the User Interface 134. This proactive signaling serves as the physical trigger for the Primary Application Processor 310 to begin the high-integrity data filtering and attribute assembly defined in the Pre-Transaction Logic of FIG. 2.

Figure 2:
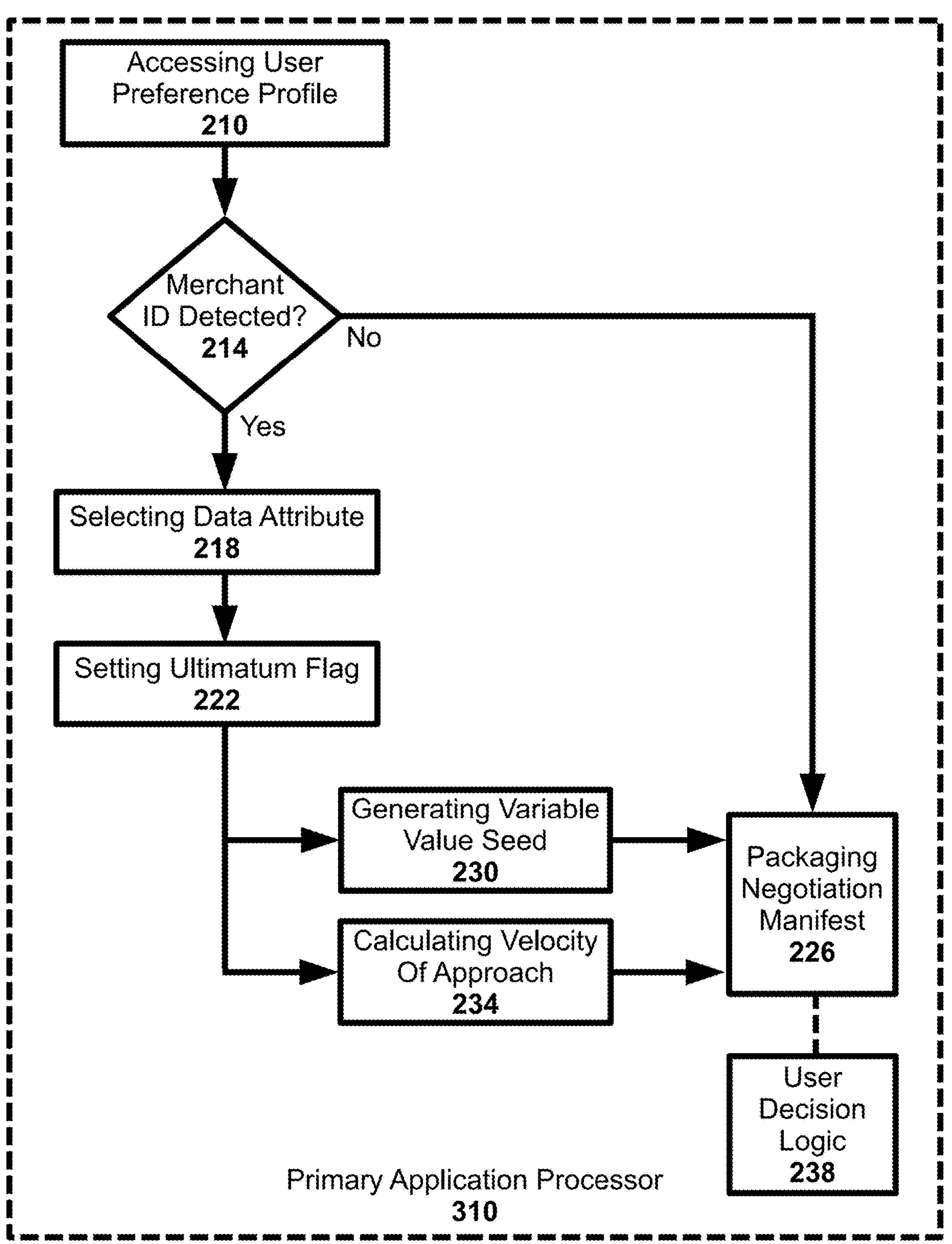
FIG. 2 is a logic flow diagram illustrating the pre-transaction sequence for data attribute selection and meta-data preparation in accordance with the present disclosure.
Figure 7:
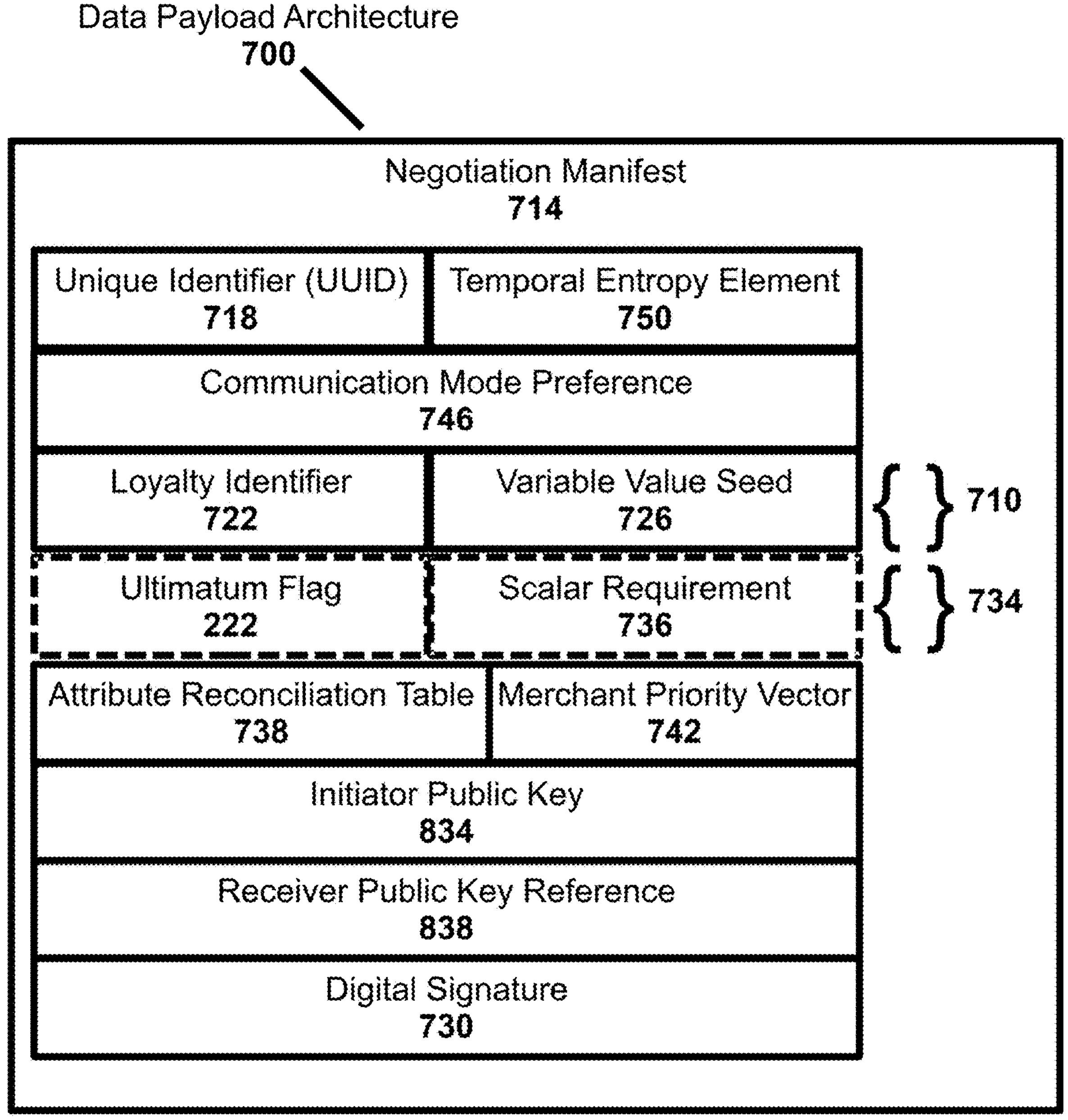
FIG. 7 is a block diagram representing the data payload architecture and negotiation manifest structure in accordance with the present disclosure.

Referring to FIG. 2, a logic flow is illustrated for the Pre-Transaction Logic executed by the Primary Application Processor 310 (see FIG. 3) to perform the step of Packaging Negotiation Manifest 226 (see FIG. 7). This sequence enables the Mobile Initiator 110 (see FIG. 1) to dynamically construct a context-aware bit-stream anchored in human agency prior to energizing the RF or optical emission interface.

Figure 3:
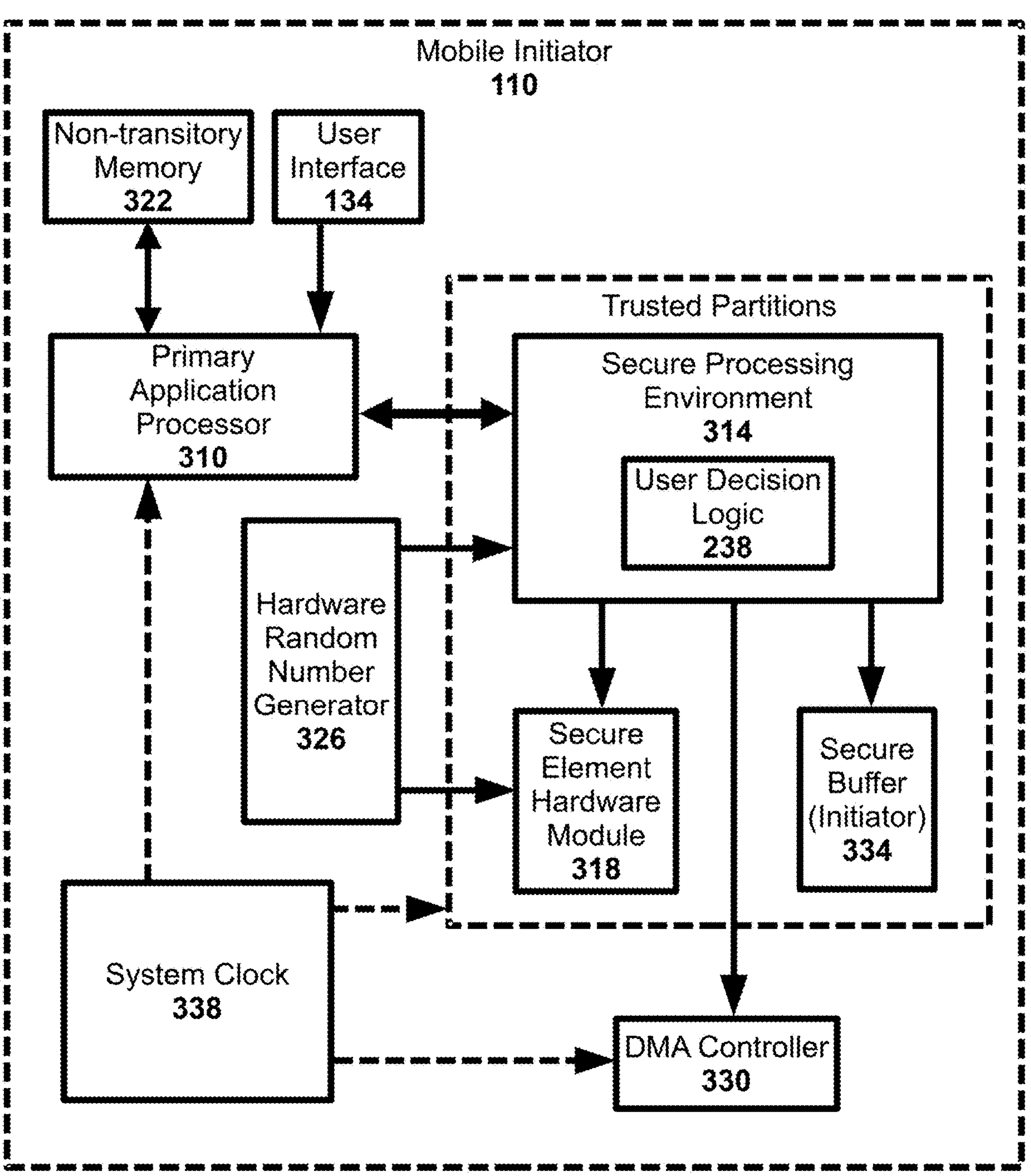
FIG. 3 is a block diagram illustrating the hardware partitions of the mobile initiator, including the secure processing environment and secure element hardware module, in accordance with the present disclosure.

The sequence initiates at step 210, wherein the Secure Processing Environment 314 derives a Merchant Priority Vector 742 based on cryptographically-attested metadata and pre-defined rule-sets established via the User Interface 134 (see FIG. 1) and stored in the Non-Transitory Memory 322 (see FIG. 3). These parameters physically instantiate the user's Reconciliation Threshold 736. The logic then proceeds to the decision gate at step 214, Is a merchant ID detected?. During this step, the Primary Application Processor 310 analyzes telemetry from the User Intent Generator 138 (see FIG. 1), which interprets data from the Ambient Sensor 126 to distinguish between environmental noise and a valid proximity marker or visual terminal identifier. If no valid ID is identified (the "No" path), the logic proceeds to step 226 for packaging a discovery-mode manifest or, alternatively, reverts to a standby state.

If a valid merchant ID is confirmed (the "Yes" path), the logic advances to step 218, Selecting Selectable Data Attribute. In this step, the Primary Application Processor 310 filters available data tokens—such as the Loyalty Identifier 722 (see FIG. 7)—restricting the selection to attributes pre-authorized for the detected merchant. Upon selection, the logic executes step 222, Setting Ultimatum Flag, where a 1-bit mandatory requirement is appended to the metadata of the selected attribute within the Negotiation Manifest 714. This flag acts as a hardware-level conditional that the User Decision Logic 238 is configured to verify against terminal responses relative to the Reconciliation Threshold 736.

To provide cryptographic and temporal entropy, the logic proceeds to step 230, Generating Variable Value Seed, utilizing the Hardware Random Number Generator 326 (see FIG. 3) to derive a unique session string. Simultaneously, at step 234, Calculating Velocity-of-Approach, the system samples the spatial telemetry provided by the User Intent Generator 138 to determine an emission timing constant. This timing constant ensures the signal is emitted only when the user's physical trajectory confirms a human-anchored intent to engage.

The sequence concludes at step 226, Packaging Negotiation Manifest, where the Primary Application Processor 310 aggregates the selected attributes, the Ultimatum Flag 222, the Variable Value Seed 230, the Merchant Priority Vector 742, and the intent-based timing data into a structured Tag-Length-Value (TLV) payload. This finalized manifest is then transferred to the Secure Processing Environment 314 (see FIG. 3) for signing. The User Decision Logic 238 maintains a persistent gate over this process, ensuring that the finalized manifest is only released to the Signal Output Interface 414 (see FIG. 4) once the environmental triggers align with the user's pre-defined preferences, and further authorizes the Settlement Instruction 1418 upon transaction finality.

In a practical application, such as a user approaching a "Fast Food Drive-Thru," the User Intent Generator 138 identifies the restaurant's marker at step 214 based on the user's forward velocity. The Primary Application Processor 310 pulls a "Vegetarian Preference" token at step 218 as previously set via the User Interface 134, and sets an Ultimatum Flag 222 requiring the composite value exchange to satisfy the Reconciliation Threshold 736. By the time the user reaches the point-of-sale, the manifest has been structured via step 226, ensuring the negotiation parameters are fixed and verified within the secure partitions of FIG. 3 before any data is emitted into the physical environment.

Referring to FIG. 3, an Initiator Hardware Architecture is illustrated, depicting the physical and logical partitioning of the Mobile Initiator 110 (see FIG. 1). The architecture is specifically configured to isolate sensitive negotiation logic and cryptographic operations within a hardware-secured domain, ensuring that the Unprompted Machine-Readable Signal 118 (see FIG. 1) is synthesized—whether as a magnetic flux or a spatially-modulated optical pattern—under the direct enforcement of human-predefined constraints and precise temporal control.

The hardware assembly is centered around a Primary Application Processor 310, comprising a general-purpose System-on-Chip (SoC) for managing the device operating system and the User Agency Management functions. The Primary Application Processor 310 hosts the user-facing OS and manages inputs from the User Interface 134 (see FIG. 1), which establishes the parameters for the Attribute Reconciliation Table 738 (see FIG. 7). To ensure the integrity of unprompted negotiations, the Primary Application Processor 310 is communicatively coupled to a Secure Processing Environment 314 via a dedicated secure bus. The Secure Processing Environment 314 represents a hardware-partitioned logic area, such as a Trusted Execution Environment (TEE), configured to execute the trusted code paths for manifest assembly and to govern the high-frequency refresh requirements of optical signaling.

Further isolated is a Secure Element Hardware Module 318, comprising a tamper-resistant integrated circuit (IC) that is physically or logically distinct from the Primary Application Processor 310. The Secure Element Hardware Module 318 maintains an internal, non-exportable Initiator Private Key 316 stored within a shielded enclave. The Secure Element Hardware Module 318 is configured to store persistent private keys and perform high-integrity operations, such as utilizing the Initiator Private Key 316 to generate the Digital Signature 730 (see FIG. 7) or deriving the ZKP Token 918 (see FIG. 9). The Secure Element Hardware Module 318 is restricted from direct access by the Primary Application Processor 310, utilizing the Secure Processing Environment 314 as a primary cryptographic gate.

The architecture further includes Non-Transitory Memory 322, which serves as a persistent storage repository for preference profiles and environmental rule-sets. To support randomized protocol elements, a Hardware Random Number Generator 326 is provided as a physical entropy source. This module provides high-quality random seeds directly to the Secure Element Hardware Module 318 and the Secure Processing Environment 314 for the creation of the Variable Value Seed 230 (see FIG. 2).

Crucial to the temporal integrity of the system is the System Clock 338, a hardware oscillator that provides the unified temporal heartbeat for the architecture. The System Clock 338 interconnects the Primary Application Processor 310, the Secure Processing Environment 314, the Synthesis Processor 410 (see FIG. 4), the Dynamic Pattern Generator 442, and the Electronic Display 454. This hardware-level synchronization ensures signal rhythm for self-clocked emissions and provides the necessary time-base for the dual-state switching sequence of FIG. 6.

To facilitate high-velocity signal delivery, the architecture incorporates a DMA Controller 330. The DMA Controller 330 is communicatively coupled to the Secure Processing Environment 314 and is configured to move the Negotiation Manifest 714 (see FIG. 7) and generated optical patterns directly to the Signal Output Interface 414 (see FIG. 4) via a dedicated high-speed signal bus. This direct path maintains temporal integrity by bypassing the general-purpose registers of the Primary Application Processor 310.

Additionally, a Secure Buffer (Initiator) 334 is provided within the trusted partitions (314/318) to serve as volatile memory for transient session data. The Secure Buffer 334 isolates the Communication Mode Preference 746 (see FIG. 7) and the Ultimatum Flag 222 (see FIG. 2) during the assembly process. Integrated within the trusted execution path is the User Decision Logic 238, a hard-coded gate residing internally to the Secure Processing Environment 314. The User Decision Logic 238 compares the results of the "Ultimatum" negotiation against the user's pre-set choices to authorize final execution, gating the transition to settlement.

At its core, the Initiator Hardware Architecture serves as a "Secure Autonomous Proxy." The physical separation of the Secure Element 318 and the Primary Application Processor 310 enables a trusted execution path for commercial agency. This ensures that the user's privacy boundaries and financial ultimatums are enforced by dedicated logic layers, such as the User Decision Logic 238, providing a robust defense against software-level vulnerabilities while maintaining the agility required for unprompted emissions.

In a practical application, such as a mobile device initiating a transaction via a dynamic QR code on an Electronic Display 454 (see FIG. 4), the user's root identity and the Initiator Private Key 316 are maintained exclusively within the Secure Element Hardware Module 318. When the Primary Application Processor 310 identifies a merchant's proximity via the User Intent Generator 138 (see FIG. 1), the Secure Processing Environment 314 retrieves the required "Ultimatum" logic. The Hardware Random Number Generator 326 provides a unique session seed, and the Secure Element Hardware Module 318 signs the resulting manifest using the Initiator Private Key 316. The DMA Controller 330 then pushes this signed packet directly to the Secure Buffer 334 for visual emission modulation, with the entire sequence timed by the System Clock 338. This configuration ensures the integrity of the optical negotiation remains unassailable, as the generation and final authorization are isolated within hardware partitions feeding the Signal Output Interface 414 of FIG. 4.

Figure 4:
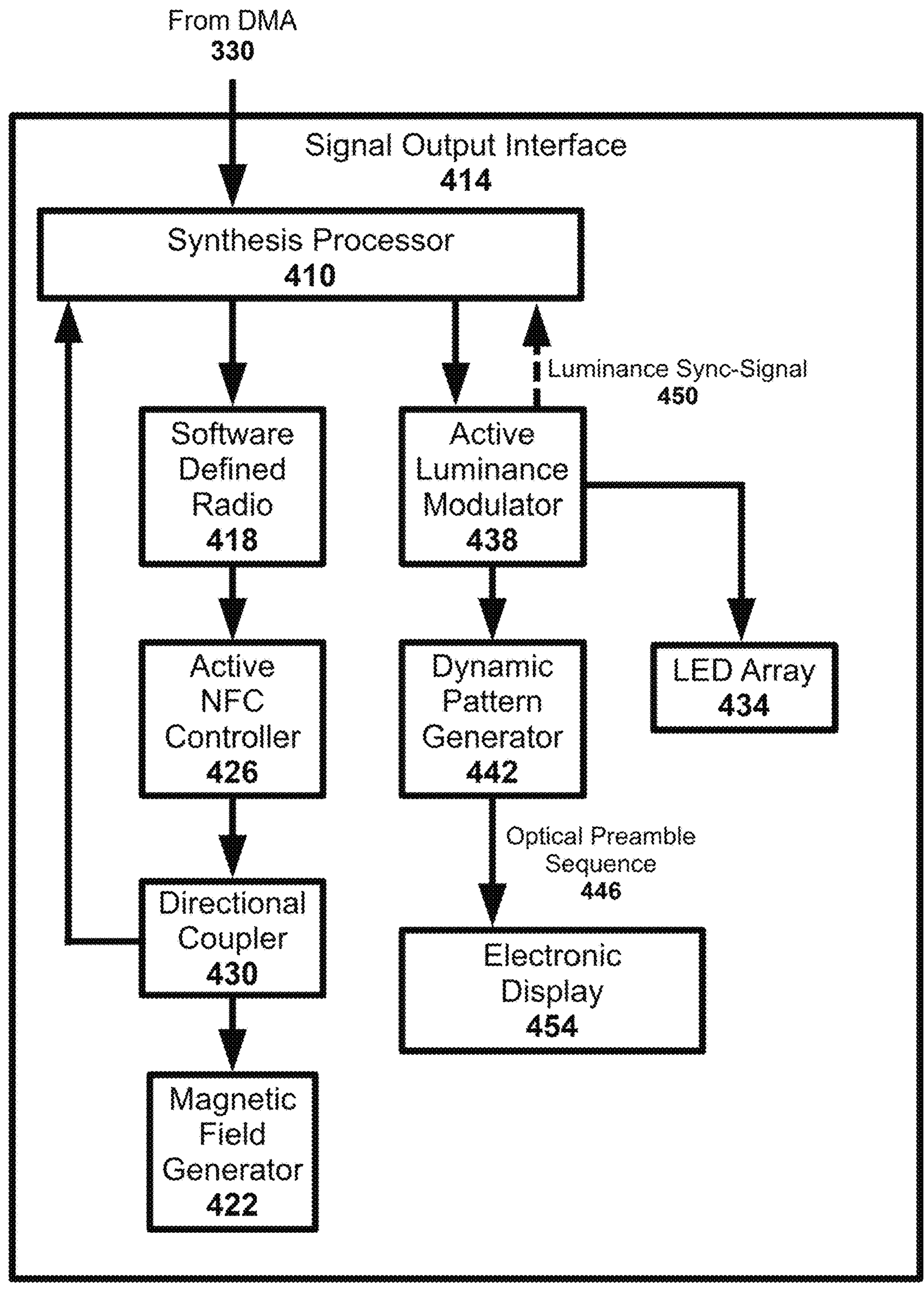
FIG. 4 is a functional block diagram of the signal output interface, depicting the multi-modal emission ports for RF and optical signaling, in accordance with the present disclosure.

Referring to FIG. 4, a Signal Output Interface 414 is illustrated, representing the hardware assembly responsible for the physical synthesis and emission of the Unprompted Machine-Readable Signal 118 (see FIG. 1). The Signal Output Interface 414 is a Multi-Modal Emission Port configured to enable the Mobile Initiator 110 to generate a high-energy active magnetic flux, an RF emission, or a spatially-modulated optical pattern independently of an external interrogation field.

The interface is managed by a Synthesis Processor 410 (Initiator-side), which is a dedicated execution unit managing waveform synthesis. The Synthesis Processor 410 is communicatively coupled to a Software Defined Radio (SDR) 418, which serves as a programmable RF front-end for synthesizing the modulation schemes defined in the Negotiation Manifest 714 (see FIG. 7). The SDR 418 is enabled to generate waveforms across multiple frequency bands, including the 13.56 MHz band for inductive coupling and the 2.4 GHz band for long-range emission.

The synthesized signal is routed to an Active NFC Controller 426. In an instance of hardware-level enforcement, the Communication Mode Preference 746 (see FIG. 7) is applied to both the Active NFC Controller 426 and the Active Luminance Modulator 438 as a state-priority vector. If the preference is set to prioritize "Active-Unprompted," the Active NFC Controller 426 physically disables its internal load-modulation circuits. For inductive emissions, the Active NFC Controller 426 is coupled to a Magnetic Field Generator 422, comprising an inductive coil and power driver stage configured to produce the active magnetic flux required for the Unprompted Machine-Readable Signal 118.

To support high-utility optical embodiments, the Signal Output Interface 414 further incorporates an Active Luminance Modulator 438. This controller varies the brightness, refresh rate, or chromatic output of the Electronic Display 454 at high frequencies to embed the Data Payload 710 within a visual field. The Active Luminance Modulator 438 drives a Dynamic Pattern Generator 442, which provides the Temporal Display Logic responsible for rendering time-varying machine-readable codes. The Dynamic Pattern Generator 442 is physically coupled to the Electronic Display 454, which serves as the physical emission hardware that "throws" the spatially-modulated optical signal into the environment.

These patterns are updated based on the Temporal Entropy Element 750 (see FIG. 7) and timed by the System Clock 338 (see FIG. 3) to mitigate replay attacks. Before the primary payload is transmitted, the Dynamic Pattern Generator 442 may output an Optical Preamble Sequence 446 via the Electronic Display 454, designed to trigger a hardware interrupt on a receiver.

Figure 10:
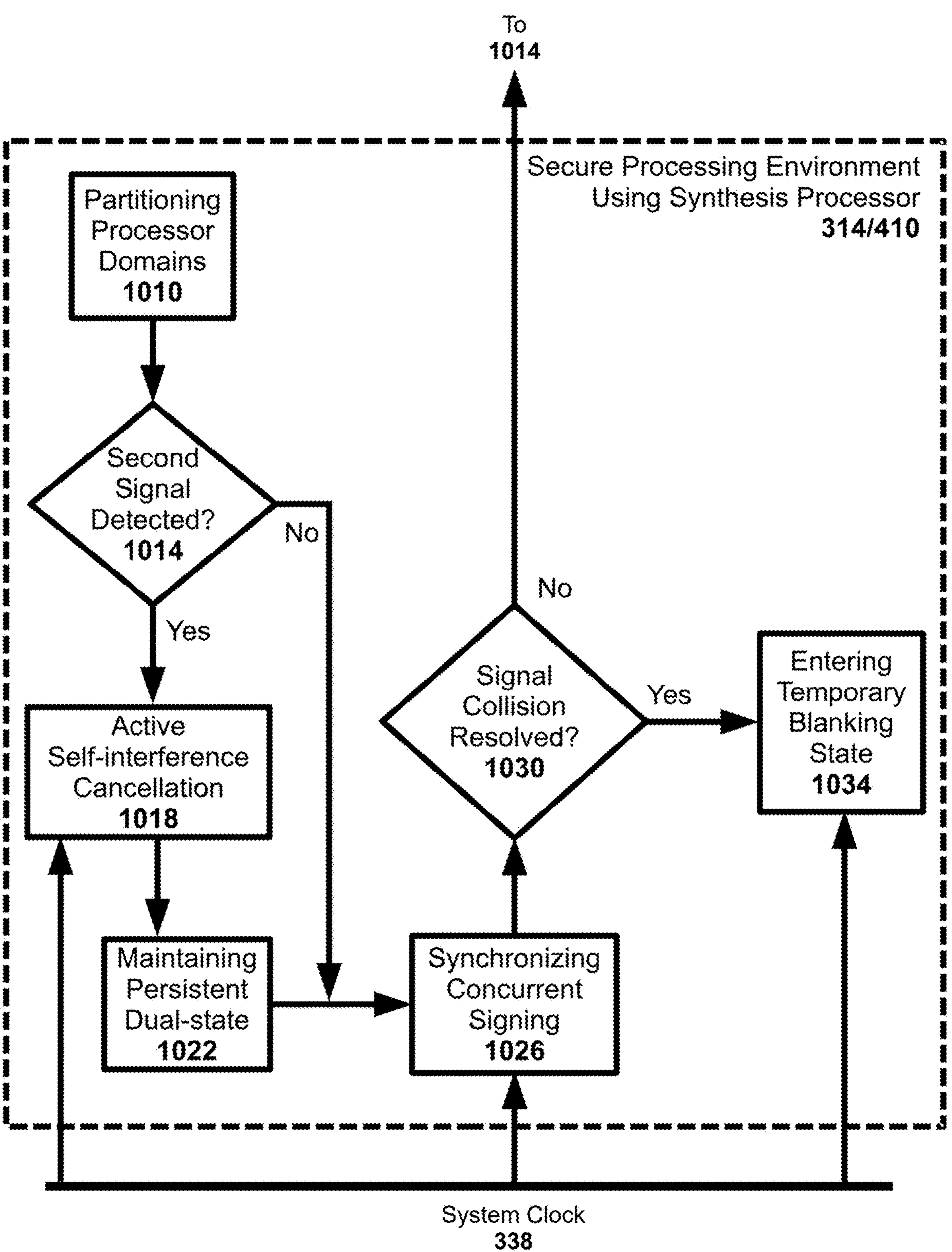
FIG. 10 is a functional block diagram illustrating concurrent transaction handling, processor domain partitioning, and active self-interference cancellation in accordance with the present disclosure.

To maintain signal integrity, a Directional Coupler 430 is positioned within the signal path to sample the outgoing waveform and provide a real-time reference signal to the Synthesis Processor 410 for Active Self-Interference Cancellation 1018 (see FIG. 10). Similarly, the Active Luminance Modulator 438 provides a temporal sync-reference via the Luminance Sync-Signal 450 to the Synthesis Processor 410 to facilitate ambient luminance filtering and glare cancellation. Additionally, the Signal Output Interface 414 incorporates an LED Array 434, driven by the Signal Output Interface 414, as a supplemental optical output mechanism.

In a practical application, such as an automated transit gate, the Mobile Initiator 110 utilizes the Dynamic Pattern Generator 442 to render an unprompted secure credential on the Electronic Display 454 as the user approaches. Simultaneously, the Active Luminance Modulator 438 pulses the display with the Optical Preamble Sequence 446. Because the credentials are tied to a unique session seed and updated per-frame via the System Clock 338, the emission is both unprompted and cryptographically fresh. This hardware-level agility facilitates the initiator "shouting" its intent via light from the Electronic Display 454 while the internal processors remain ready to receive a response, ensuring the user's "Ultimatum" as defined in the User Interface 134 is maintained throughout the physical emission.

Figure 5:
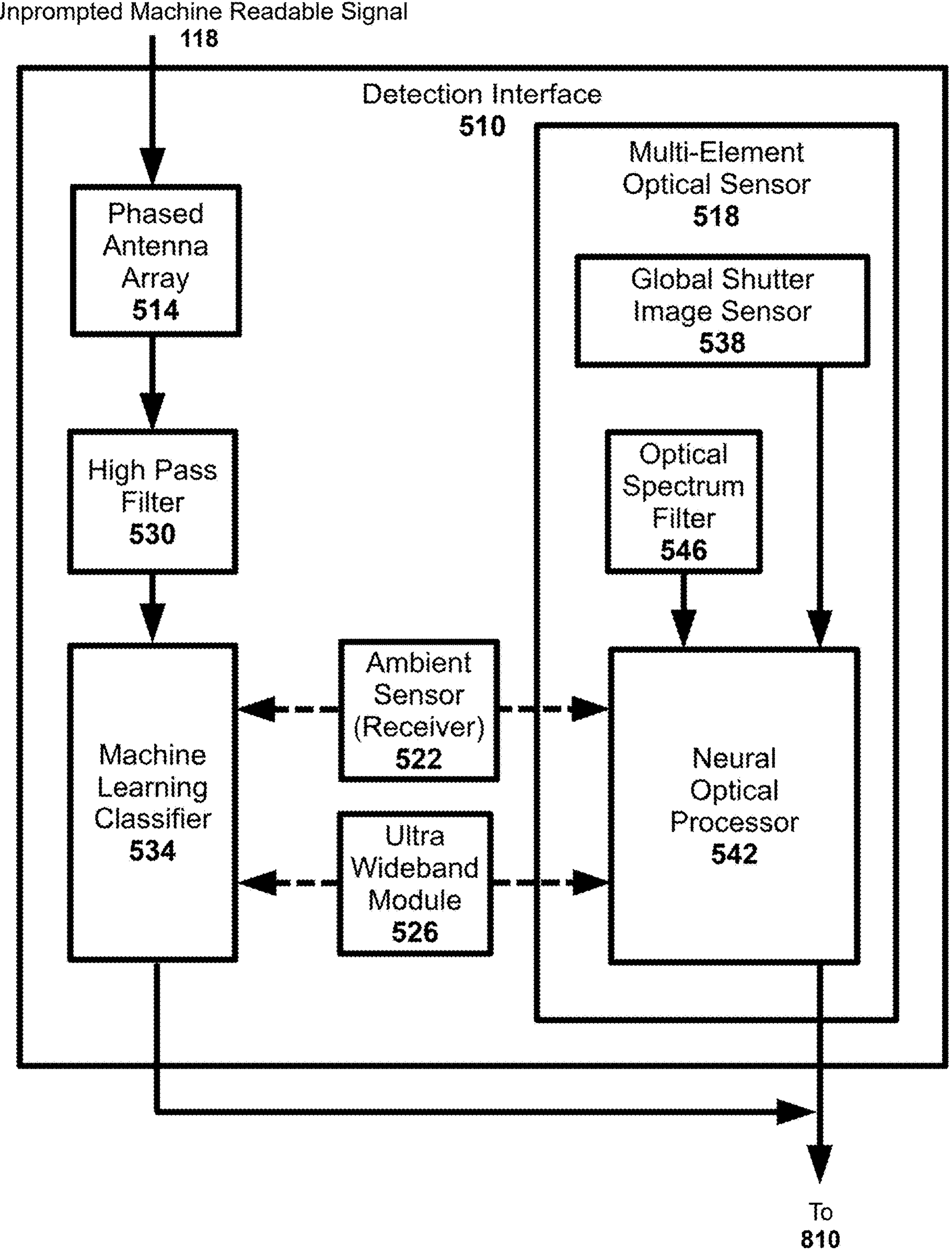
FIG. 5 is a block diagram of the detection interface, including the phased antenna array and neural optical processor, in accordance with the present disclosure.

Referring to FIG. 5, a Detection Interface 510 is illustrated, representing the receiver-side hardware assembly of the Electronic Receiving Device 114 (see FIG. 1). The interface is configured as an "always-on" listening post designed to isolate the spectral signature of the Unprompted Machine-Readable Signal 118 from ambient electromagnetic and optical noise.

The primary RF capture mechanism comprises a Phased Antenna Array 514. This array consists of multiple antenna elements and a phase-shifting network configured to perform beam-steering and Angle-of-Arrival (AoA) estimation. This allows the Electronic Receiving Device 114 to facilitate a spatial lock on the Mobile Initiator 110, aiding in the verification that the incoming signal originates from a legitimate source within a defined sector.

The interface incorporates a Multi-element Optical Sensor 518 for non-RF signal capture. This sensor is configured as a stereoscopic imaging array or multi-aperture sensor—comprising a Global Shutter Image Sensor 538 and an Optical Spectrum Filter 546—capable of capturing high-resolution frames of spatially-modulated optical patterns from multiple simultaneous viewpoints. To process these visual inputs, the interface includes a Neural Optical Processor 542 residing internally to the Multi-element Optical Sensor 518, which is a dedicated hardware vision-processing unit or NPU configured to provide the processing for Visual Aiming Confirmation 1242 and Optical Parallax Verification 1238 (see FIG. 12). This processor is further enabled to detect temporal light pulses from the LED Array 434 (see FIG. 4) and convert them into a digital bitstream while simultaneously calculating the relative pixel pitch of the initiator.

For environmental gating, an Ambient Sensor 522 (Receiver-side), such as a PIR or ultrasonic sensor, is communicatively coupled to the interface logic. The Ambient Sensor 522 provides a hardware-level gate that facilitates the processor attempting to parse emissions when the physical presence of a user or vehicle is confirmed within a functional proximity. This configuration allows high-power parsing logic to be selectively engaged upon verified external presence, thereby addressing the logic deadlock in coordination with the initiator-side intent gating managed by the User Intent Generator 138. To support high-precision ranging, an Ultra-wideband (UWB) module 526 may be provided to execute time-of-flight (ToF) measurements, providing the precise distance data utilized for the Spatial Analytics logic of FIG. 12.

The signal path for captured RF data includes a High-pass Filter 530, implemented here as Adaptive Carrier-Cancellation Circuitry such as a Dynamic Gain Controller or adaptive notch filter. This circuitry is designed to selectively attenuate the high-amplitude carrier wave associated with legacy 13.56 MHz terminal polling. By suppressing the primary carrier while amplifying the low-amplitude sideband modulations, the system facilitates the isolation of the high-integrity negotiation burst from legacy polling "clutter." The processed signal is then analyzed by a Machine-Learning Classifier 534, implemented on a dedicated hardware accelerator (e.g., an NPU or DSP). This classifier is configured to distinguish the structured Data Payload 710 from background interference. Upon validation, the Machine-Learning Classifier 534 outputs the bitstream to the Local Buffer (Receiver) 810 (see FIG. 8) for reconciliation.

In a practical application, such as "Office Hot-Desking," as a worker walks into a shared office space, the Phased Antenna Array 514 situated within a desk monitor identifies the worker's laptop or smartphone while it remains within their bag. The Machine-Learning Classifier 534 isolates the worker's specific unprompted "Intent-to-Dock" signal from the background noise of other nearby devices, even in the presence of legacy badge readers. Simultaneously, the UWB Module 526 confirms the worker has physically approached the specific desk station, triggering the system to auto-unlock the docking station and adjust ergonomic settings before the worker initiates manual interaction. This physical verification leads directly to the Temporal Logic Sequence detailed in FIG. 6.

Figure 6:
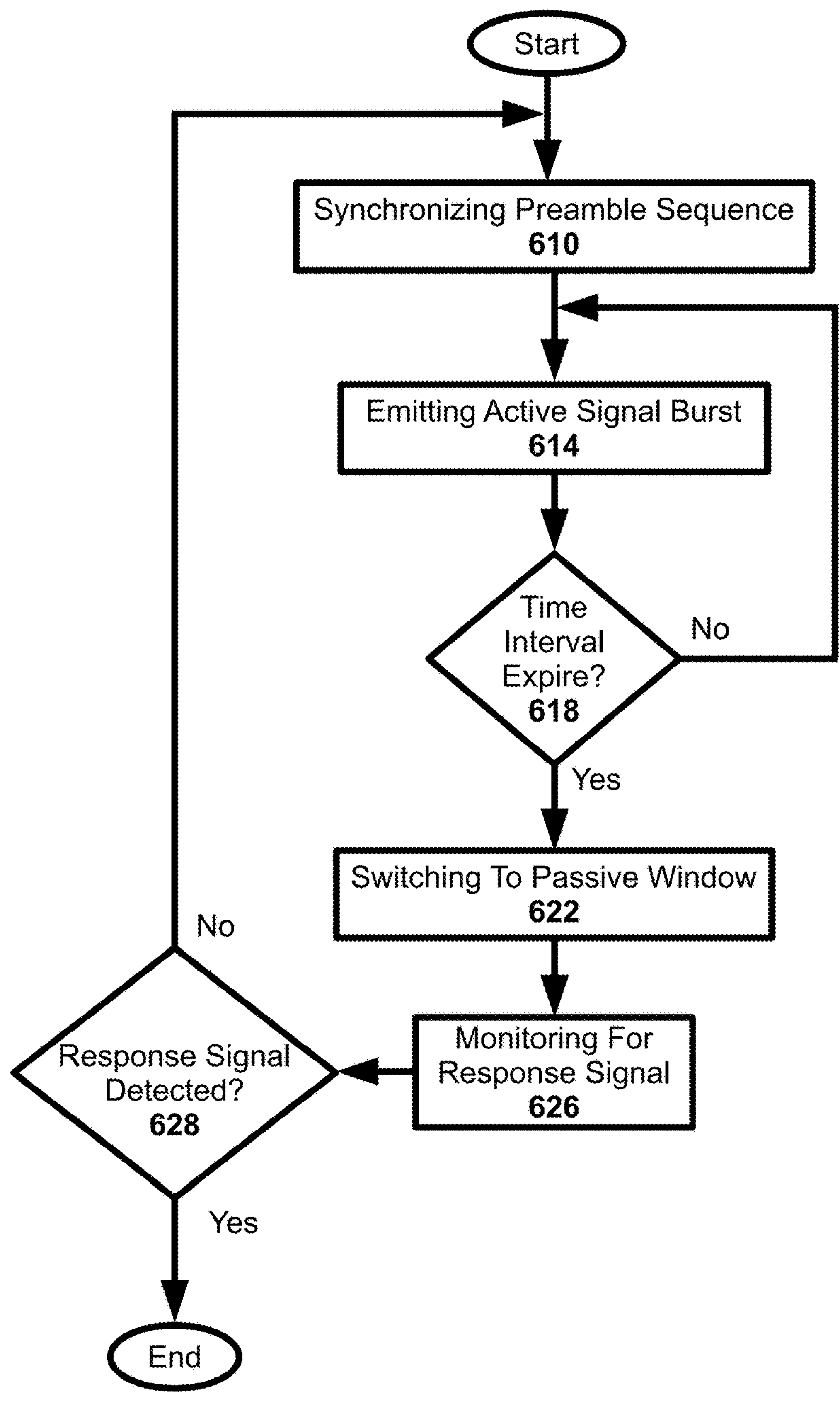
FIG. 6 is a vertical flow diagram illustrating the temporal interleaving of active and passive signal states and the dual-state switching sequence in accordance with the present disclosure.

Referring to FIG. 6, a logic flow is illustrated for a Temporal Logic Sequence representing a dual-state hardware switching protocol. This sequence is executed by the Synthesis Processor 410 (see FIG. 4) and synchronized by the System Clock 338 (see FIG. 3) to coordinate high-energy active emissions with sensitive passive listening windows via the Signal Output Interface 414 (see FIG. 4).

The sequence initiates at step 610, Synchronizing Preamble Sequence, where the Signal Output Interface 414 modulates a predefined bit-pattern or an Optical Preamble Sequence 446 via the Electronic Display 454 (see FIG. 4). This allows the Electronic Receiving Device 114 to synchronize its internal sampling clock and frequency to the incoming unprompted emission. This synchronization is anchored to the hardware-level heartbeat of the System Clock 338, ensuring the "self-clocked" nature of the emission is maintained. Upon completion of the preamble, the logic proceeds to step 614, Emitting Active Signal Burst. In this step, the Magnetic Field Generator 422 (see FIG. 4) is driven to a high-energy state to emit the Negotiation Manifest 714 (see FIG. 7) as an unprompted magnetic flux, or the Active Luminance Modulator 438 is driven to output the Data Payload 710 via the Electronic Display 454 and LED Array 434.

To manage the duration of the emission, the logic enters a decision gate at step 618, Does time-slice interval expire?. The Synthesis Processor 410 compares the elapsed transmission time against the temporal constraints defined in the Communication Mode Preference 746 (see FIG. 7) and the high-precision pulses of the System Clock 338. If the interval has not expired (the "No" path), the logic returns to step 614 to maintain the active emission. If the interval has expired (the "Yes" path), the logic advances to step 622, Switching to Passive Window. During this step, the Synthesis Processor 410 generates a hardware-level interrupt to disable the power stage of the SDR 418 (see FIG. 4) and/or momentarily attenuates the Active Luminance Modulator 438, transitioning the Signal Output Interface 414 to a non-emissive state to prevent sensor saturation and glare-interference.

Once the active flux or optical emission is neutralized, the logic executes step 626, Monitoring for Response Signal. In this state, the Detection Interface 510 (see FIG. 5) is enabled to sample the environment for a Response Signal 122 (see FIG. 1). The logic then advances to decision gate 628, Response Signal 122 detected?, to evaluate the environmental capture. If a valid signal is detected (the "Yes" path), the sequence achieves terminal success. If no signal is identified within the secondary time-slice (the "No" path), the logic is configured to loop back to the Synchronizing Preamble Sequence 610 to repeat the cycle. This switching is governed by the User Decision Logic 238 (see FIG. 3), ensuring the loop continues only as long as the environmental readiness identified by the User Intent Generator 138 remains valid.

In a practical application, such as two users approaching a double-turnstile simultaneously, the first user's device executes 614 for a 10-millisecond burst, timed by its internal System Clock 338, and then enters the passive state at 622. Because the second user's device operates on an offset temporal clock, the Electronic Receiving Device 114 is enabled to resolve the first user's Negotiation Manifest 714 while the second device is restricted to the monitoring state of 626. This time-sliced hardware gating ensures that high-density Data Payloads—whether magnetic or optical—are delivered without collision, providing the necessary temporal alignment for the Data Payload Architecture of FIG. 7.

Referring to FIG. 7, a Data Payload Architecture 700 is illustrated, representing the hierarchical bit-stream organization utilized for unprompted, asynchronous negotiations. The architecture is configured as a Tag-Length-Value (TLV) structure, enabling the Mobile Initiator 110 (see FIG. 1) to dynamically assemble a modular Data Payload 710 where specific attributes are included or omitted based on the human-authorized parameters established via the User Interface 134 (see FIG. 1).

The primary container is the Negotiation Manifest 714, which serves as the structured header defining the session parameters. Nested within is the Unique Identifier (UUID) 718, a 128-bit session-specific anchor generated by the Hardware Random Number Generator 326 (see FIG. 3). The UUID 718 is utilized as a unique cryptographic nonce to bind the Unprompted Machine-Readable Signal 118 (see FIG. 1) to the specific temporal instance of the transaction. To support optical anti-replay measures, the manifest incorporates a Temporal Entropy Element 750, providing the high-frequency seed required to synchronize the Dynamic Pattern Generator 442 (see FIG. 4) via the System Clock 338.

The architecture incorporates a Loyalty Identifier 722, comprising a merchant-specific bit-string retrieved from the User Preference Profile 210 (see FIG. 2). The Loyalty Identifier 722 is configured as a primary input to the Reconciliation Buffer 814 (see FIG. 8). To introduce entropy into the negotiation, a Variable Value Seed 726 is provided as a 32-bit string. This seed 726 is utilized by the Reconciliation Buffer 814 (see FIG. 8) as a variable input for randomized discount or value-exchange algorithms.

Crucially, the architecture includes a Constraint Manifest 734, which functions as a sub-TLV container for mandatory requirements. This manifest includes the Ultimatum Flag 222, which is configured as a 1-bit conditional gate coupled to a Reconciliation Threshold 736. This structure ensures that the hardware logic of the Electronic Receiving Device 114 (see FIG. 1) is forced to abort the settlement if the composite value of the merchant response fails to satisfy the human-defined Reconciliation Threshold 736.

Furthermore, an Attribute Reconciliation Table 738 is illustrated as a physical bit-map mapping the user's pre-authorized permissions and acceptable non-currency attributes. This table is the data-layer manifestation of the human's choices made via the User Interface 134. It is paired with a Merchant Priority Vector 742, an 8-bit scalar representing a hardware-attested sentiment weight. To define physical layer constraints, a Communication Mode Preference 746 field is provided, which dictates the required protocol (e.g., "Active-Only") to the Synthesis Processor 410.

For instance, the Merchant Priority Vector 742 functions as a hardware-encoded weighting factor that pre-conditions the autonomous negotiation logic by establishing the initiator's "degree of openness" to non-standard transaction parameters. Unlike traditional static loyalty IDs, the vector serves as a dynamic scalar that modulates the sensitivity of the Reconciliation Threshold 736; a high-value vector signals the receiver that the initiator is authorized to accept a higher ratio of non-currency attributes—such as metadata harvesting, luminance-modulated advertising, or survey participation—in exchange for state-transition finality.

Conversely, a low-value vector hardens the negotiation manifest, instructing the Autonomous Execution Logic to maintain a rigid Reconciliation Threshold 736 that rejects any state modification deviating from a clean, one-way financial discharge. By pushing this attested weight into the unprompted broadcast, the system allows the merchant's local environment to prioritize and customize the response signal based on a pre-verified trust level without requiring the disclosure of a persistent root identity.

The cryptographic foundation of the manifest is established by the Initiator Public Key 834 and the Digital Signature 730, which are generated by the Secure Element Hardware Module 318 (see FIG. 3). The Initiator Public Key 834 provides the receiving hardware with the immediate means to verify the Digital Signature 730, ensuring the integrity of the user's "terms of engagement" in a self-contained, offline manner. In specific embodiments designed for bidirectional handshakes or digital receipts, the manifest may further include a Receiver Public Key Reference 838. It should be noted, however, that the Receiver Public Key Reference 838 is an optional, non-limiting element; the architecture is expressly configured to support one-way initiation and verification using only the Initiator Public Key 834 and Digital Signature 730, thereby preserving the asynchronous nature of the broadcast.

At a technical and conceptual level, the Negotiation Manifest 714 and the Attribute Reconciliation Table 738 function as a hardware-enforced optimization engine for asynchronous state transitions. The Attribute Reconciliation Table 738 represents a multi-variable logic gate that allows the Primary Application Processor 310 to autonomously modulate the composition of the Data Payload 710. By treating data attributes as discrete computational weights, the system enables a mechanism where the hardware independently calculates the minimum necessary data release required to satisfy a local Reconciliation Threshold 736 without violating the user's agency. The manifest effectively serves as a physical-layer boundary of consent, where the release of cryptographic tokens is strictly gated by the User Decision Logic 238 (see FIG. 2).

In a practical "Grocery Coupons" application, a Data Payload 710 is assembled for a user. The Loyalty Identifier 722 confirms status, while the Negotiation Manifest 714 carries specific transactional tokens. The Constraint Manifest 734 sets a hard Reconciliation Threshold 736 requiring a specific discount threshold. If the merchant's logic cannot satisfy this, the Ultimatum Flag 222 forces a hardware-level abort. This ensures the user's frictionless experience is strictly governed by their predefined financial boundaries, leading directly to the ingestion of these terms by the Receiver Memory Architecture of FIG. 8.

Figure 8:
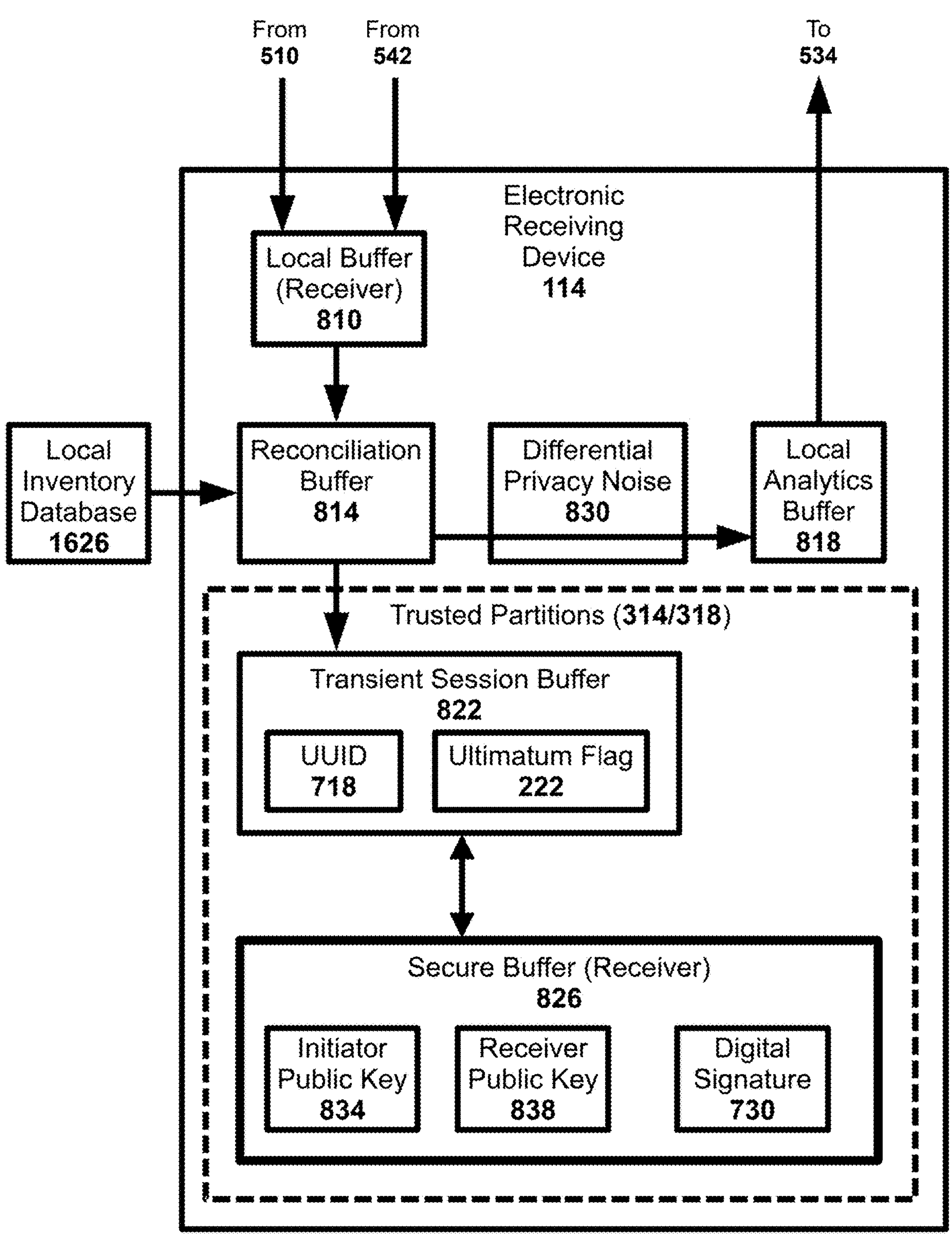
FIG. 8 is a functional block diagram of the receiver memory architecture, illustrating the reconciliation and transient session buffers, in accordance with the present disclosure.

Referring to FIG. 8, a Receiver Memory Architecture is illustrated, representing the volatile and non-volatile storage partitioning within the Electronic Receiving Device 114 (see FIG. 1). The architecture is configured to provide hardware-level isolation between raw signal ingestion and high-integrity data reconciliation, ensuring the receiver processes the transaction in accordance with the constraints established in the Attribute Reconciliation Table 738 (see FIG. 7).

The primary entry point for digitized waveforms and captured image data is the Local Buffer (Receiver) 810. This buffer comprises a high-speed circular queue enabled to capture raw samples from the Detection Interface 510 or frame data from the Neural Optical Processor 542 (see FIG. 5). Once the Machine-Learning Classifier 534 (see FIG. 5) validates a signal, a Memory Management Unit (MMU) triggers a transfer to the Reconciliation Buffer 814. The Reconciliation Buffer 814 is a partitioned memory space where the Negotiation Manifest 714 (see FIG. 7) is staged for comparison against local environmental data, such as merchant pricing or the Local Inventory Database 1626 (see FIG. 16).

To maintain the anonymity defined in the manifest, the architecture incorporates a Local Analytics Buffer 818 coupled with a Differential Privacy Noise 830 element. The Local Analytics Buffer 818 is accessible by the Machine-Learning Classifier 534 for metadata processing. The Differential Privacy Noise 830 acts as a hardware-level entropy injector that applies statistical noise to non-transactional metadata (e.g., RSSI, timing, or pixel coordinates) before it is committed to persistent storage. This ensures that environmental optimization data remains decoupled from the Unique Identifier (UUID) 718.

Session-specific data is maintained in a Transient Session Buffer 822. This buffer is configured to store the UUID 718 and the current state of the Ultimatum Flag 222 (see FIG. 2) for the duration of the Locking Temporal Transaction Window 1226 (see FIG. 12). The Transient Session Buffer 822 provides the buffered attributes for the legacy bridge logic of FIG. 11 and provides the recovery key 1430 to facilitate asynchronous sync.

Cryptographic assets and verification logic are strictly isolated within the Secure Buffer (Receiver) 826. In accordance with the hardware partitioning of FIG. 3, this buffer represents a hardware-protected memory region residing within the Secure Processing Environment 314, utilized for the temporary caching of the Initiator Public Key 834 and the Digital Signature 730 extracted from the incoming manifest. The Secure Buffer 826 utilizes the Secure Element Hardware Module 318 as a primary cryptographic gate to perform an immediate, local verification of the transaction's integrity. To support bidirectional handshakes or the generation of digital receipts, the buffer may additionally store or reference a Receiver Public Key Reference 838. While the inclusion of the 838 reference facilitates advanced mutual authentication, the architecture is specifically designed such that the Secure Buffer 826 can complete high-integrity reconciliation using only the Initiator Public Key 834 to validate the Digital Signature 730, ensuring the device remains responsive in one-way, unprompted communication environments.

In a practical application, such as a rental car return kiosk, the Reconciliation Buffer 814 aggregates the user's "Insurance Token" from the Data Payload 710 and the car's "Current Mileage" reported by the kiosk hardware. This merged state is held in the Transient Session Buffer 822 while the Secure Buffer 826 executes the signature verification using the Initiator Public Key 834. This process ensures the kiosk operates within the "Terms of Engagement" defined by the user via the User Interface 134. Upon successful reconciliation, the UUID 718 is utilized as the anchor for the Settlement & Finality logic of FIG. 14. This stratified approach ensures that the negotiation parameters are reconciled in a secure, isolated environment before the system proceeds to the cryptographic verification of credentials.

Figure 9:
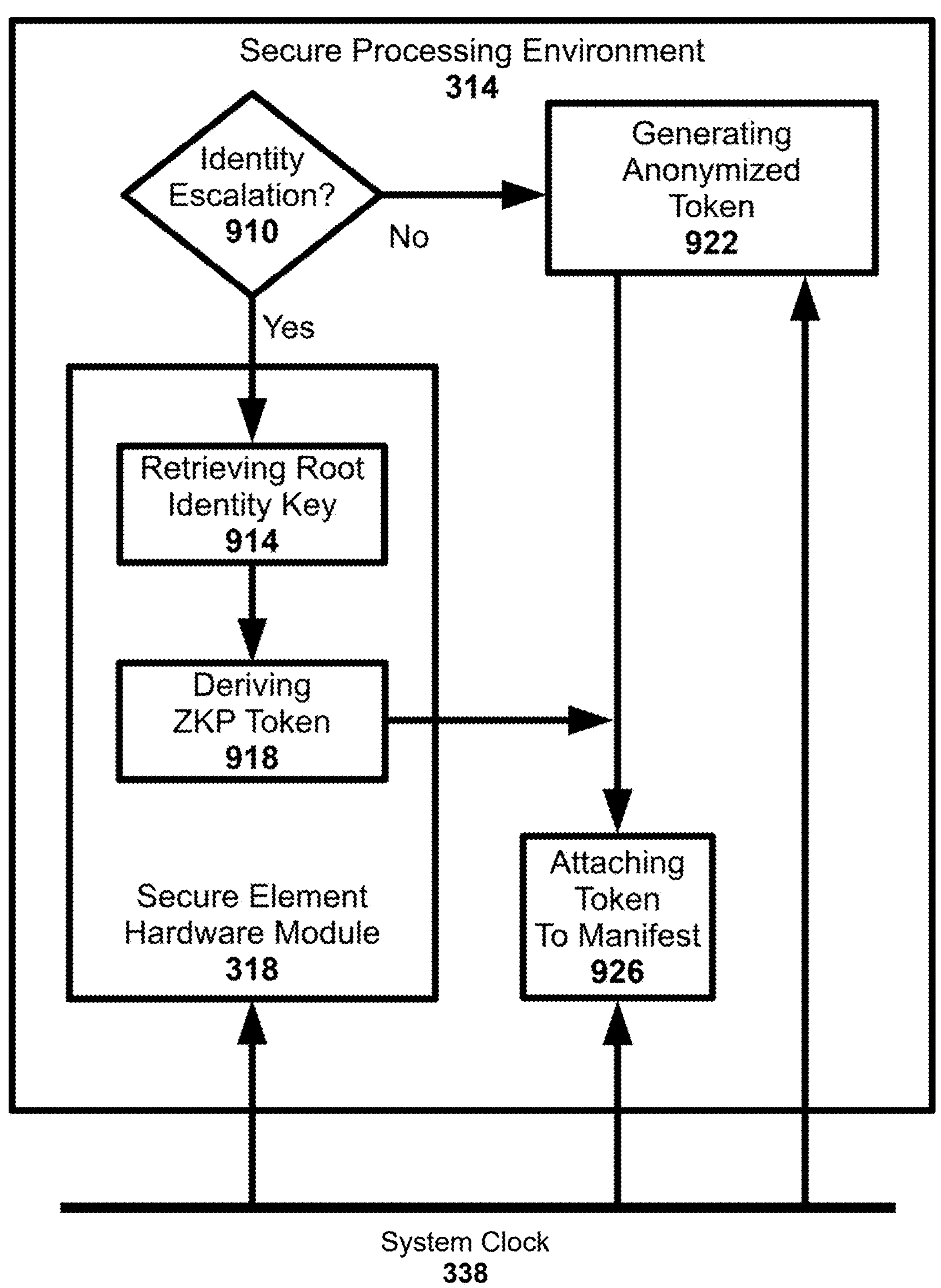
FIG. 9 is a logic flow diagram illustrating the generation of anonymized tokens and zero-knowledge proof tokens within the secure element in accordance with the present disclosure.

Referring to FIG. 9, a logic flow for Token Generation Logic is illustrated, representing the privacy-preserving cryptographic protocols executed within the Secure Processing Environment 314 (see FIG. 3). This sequence is configured to satisfy verification requirements without disclosing persistent identifiers or personally identifiable information (PII).

The process initiates at step 910, Requesting Identity Escalation?, where the Secure Processing Environment 314 executes a bit-wise comparison between the Constraint Manifest 734 (see FIG. 7) and the receiver's required verification level. If no escalation is required (the "No" path), the logic leads to step 922, Generating Anonymized Token. If identity escalation is required (the "Yes" path), the logic leads to step 914, Retrieving Root Identity Key.

In step 922, the Secure Processing Environment 314 performs a hashing operation on the Unique Identifier (UUID) 718 (see FIG. 7) salted with a session-specific nonce from the Hardware Random Number Generator 326 (see FIG. 3), ensuring the output is decoupled from the device hardware ID. During step 914, the Secure Processing Environment 314 issues a hardware-level command to the Secure Element Hardware Module 318 (see FIG. 3) to access a persistent Private Key 316. The logic then proceeds to step 918, Deriving ZKP Token, where the Secure Element Hardware Module 318 generates a cryptographic proof—such as a zk-SNARK or Schnorr signature—asserting a specific attribute without revealing the underlying root key data. In a "Historical Chain" mode, this step is configured to incorporate a hash of a prior Transaction-Finality Token 1422 (see FIG. 14) to prove a continuity of interaction without linking to a persistent profile.

The sequence concludes at step 926, Attaching Token to Manifest, where the Secure Processing Environment 314 performs a memory-write operation to concatenate the derived proof or anonymized token into the designated TLV field of the Negotiation Manifest 714. This terminal action updates the Data Payload 710 in the Secure Buffer (Initiator) 334 (see FIG. 3) for immediate emission.

In a practical "Employee Training/Access" application, a contractor at a restricted job site must prove they possess a valid "Active Safety Certification" to trigger a physical interlock. At step 914, the Secure Element Hardware Module 318 retrieves the root certification key and, at step 918, derives a ZKP Token 918 that asserts "Certified=True." Crucially, this proof is generated without sharing the contractor's name or full HR file with the site's local terminal. The token is attached at step 926 and proactively emitted, allowing the contractor to walk through the gate without stopping for a manual credential check, with the entire sequence timed by the System Clock 338.

Referring to FIG. 10, a functional block diagram for Concurrent Processing is illustrated, representing the dual-state domain management required for simultaneous unprompted negotiation and legacy interrogation. This architecture is executed by the Synthesis Processor 410 (see FIG. 4) and the Secure Processing Environment 314 (see FIG. 3) to enable high-integrity communication across asynchronous logical layers.

The architecture includes Partitioning Processor Domains 1010, where the Secure Processing Environment 314 hardware-isolates cryptographic execution threads from non-secure operating system tasks. This ensures that the generation of the Digital Signature 730 (see FIG. 7) is gated from the general-purpose interrupts of the Primary Application Processor 310. The logic further includes a decision block 1014, Is a second signal detected?, where the Detection Interface 510 (see FIG. 5) monitors for an external interrogation field that overlaps the unprompted emission window.

If a second signal is identified (the "Yes" path), the architecture leads to Active Self-Interference Cancellation 1018. If no second signal is identified (the "No" path), the logic leads directly to Synchronizing Concurrent Signing 1026. In block 1018, the Synthesis Processor 410 utilizes the real-time reference sample from the Directional Coupler 430 (see FIG. 4) to neutralize local transmit (TX) leakage, enabling the receiver to isolate the incoming Response Signal 122 (see FIG. 1). Following this, the system executes Maintaining Persistent Dual-State 1022, which provides input to Synchronizing Concurrent Signing 1026, where the hardware is configured to interleave active emission slots with passive listening windows via a time-division duplexing (TDD) schedule.

To ensure the integrity of the manifest, the architecture executes Synchronizing Concurrent Signing 1026. During this operation, the Secure Element Hardware Module 318 (see FIG. 3) is triggered to sign the Negotiation Manifest 714 while the Primary Application Processor 310 maintains the state of a secondary legacy handshake. If the hardware identifies that the overlapping signals exceed the cancellation capacity at the Resolving Signal Collision? 1030 block, the system enters a Temporary Blanking State 1034, where the Synthesis Processor 410 issues a hardware-level "Mute"

to the Local Buffer (Receiver) 810 (see FIG. 8) and the Reconciliation Buffer 814 to prevent the ingestion of invalidated data.

In a practical "Hybrid Vending" application, a legacy machine is actively polling for a physical credit card tap while simultaneously "listening" for a mobile initiator's unprompted loyalty signal. Through Active Self-Interference Cancellation 1018, the terminal filters its own 13.56 MHz polling noise to capture the user's Negotiation Manifest 714. Simultaneously, the user's mobile device synchronizes the signing of an Ultimatum while the Primary Application Processor 310 renders the transaction UI. This dual-state agility ensures the modern, unprompted negotiation occurs without disrupting the legacy card-polling experience.

Figure 11:
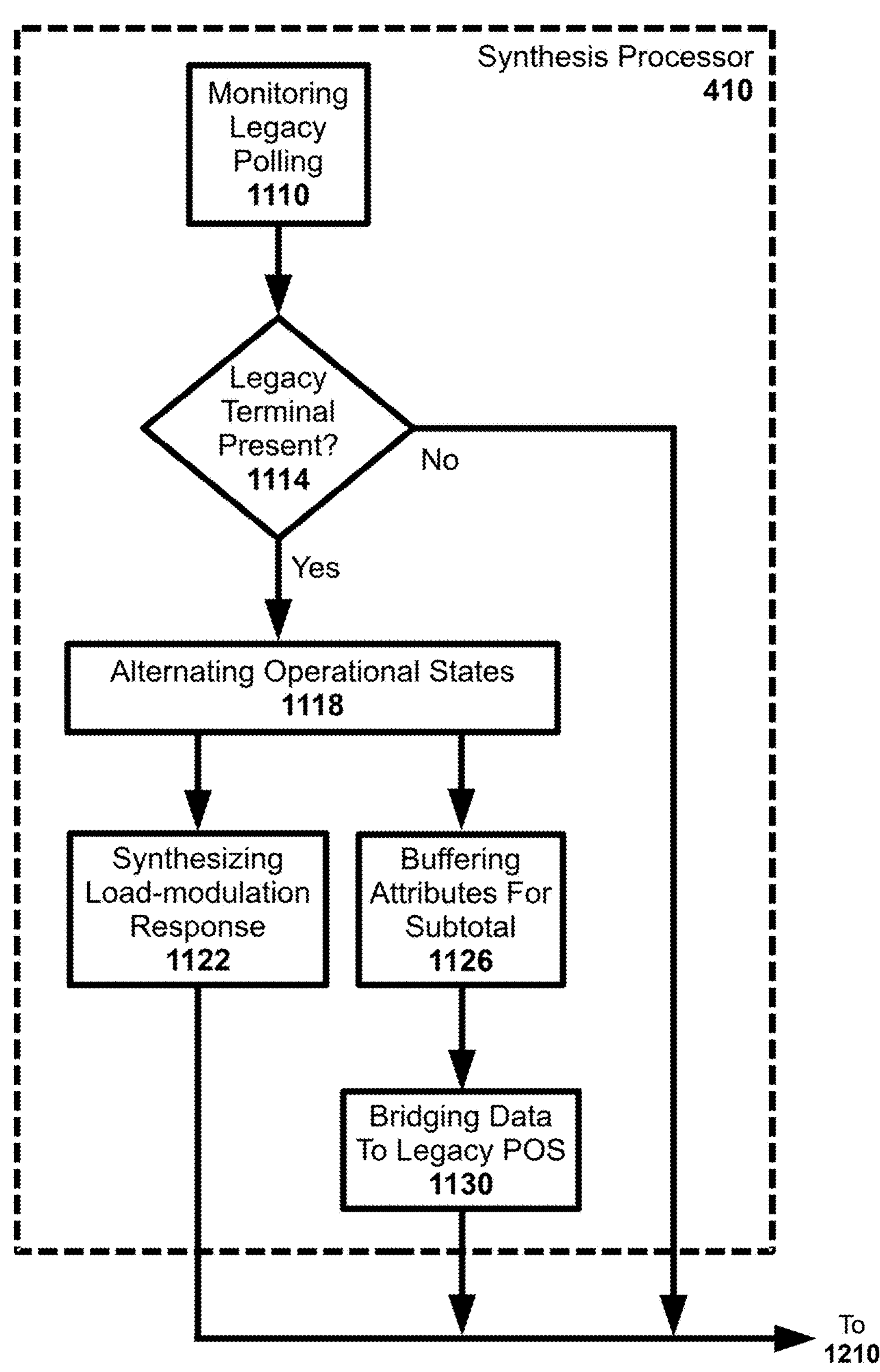
FIG. 11 is a logic flow diagram illustrating hybrid transaction handling and the bridging of modern attributes to legacy point-of-sale systems in accordance with the present disclosure.

Referring to FIG. 11, a logic flow for Hybrid Handling is illustrated, representing the operational sequence for alternating between modern unprompted protocols and legacy interrogation standards. This sequence is executed by the Synthesis Processor 410 (see FIG. 4) to ensure backward compatibility with infrastructure lacking proactive negotiation logic.

The sequence initiates at step 1110, Monitoring Legacy Polling, where the Synthesis Processor 410 continuously samples the Detection Interface 510 (see FIG. 5) for standard ISO-14443 Type A/B modulation. The logic proceeds to the decision gate at step 1114, Is a legacy terminal present?. If no legacy carrier is detected (the "No" path), the logic is configured to bypass the emulation sequence and advance directly to the spatial analytics of FIG. 12.

If a legacy terminal is confirmed (the "Yes" path), the logic proceeds to step 1118, Alternating Operational States. During this step, the Synthesis Processor 410 issues a state-switch command to toggle the Active NFC Controller 426 (see FIG. 4), physically disabling the Magnetic Field Generator 422 and enabling internal load-modulation circuits. This step 1118 is synchronized with the Switching to Passive Window 622 (see FIG. 6). The logic then executes step 1122, Synthesizing Load-Modulation Response, where the controller emulates a standard Magnetic Stripe Data (MSD) structure or legacy smartcard APDU to deliver a payload recognizable by the terminal.

Simultaneously, the Primary Application Processor 310 (see FIG. 3) executes step 1126, Buffering Attributes for Subtotal, where modern attributes from the Negotiation Manifest 714 (e.g., loyalty tokens) are maintained in the Transient Session Buffer 822 (see FIG. 8). The logic then proceeds to step 1130, Bridging Data to Legacy POS, where these modern attributes are translated into the specific serial or analog data formats required by the Legacy Point-of-Sale Interface 1610 (see FIG. 16). This hybrid agility ensures that the modern Ultimatum requirements established via the User Interface 134 are maintained even when interacting with legacy hardware.

In a practical application, a modern phone approaching an older vending machine detects the machine's legacy poll at step 1110. The phone executes step 1118 to pause its proactive emission and, at step 1122, synthesizes a load-modulation response that emulates a traditional credit card. Simultaneously, it bridges a digital employee discount from the modern manifest to the vending machine's serial processor at step 1130. Once the legacy handshake is established, the logic triggers a transition to FIG. 12 to execute the Spatial Analytics required to maintain the transaction lock.

Figure 12:
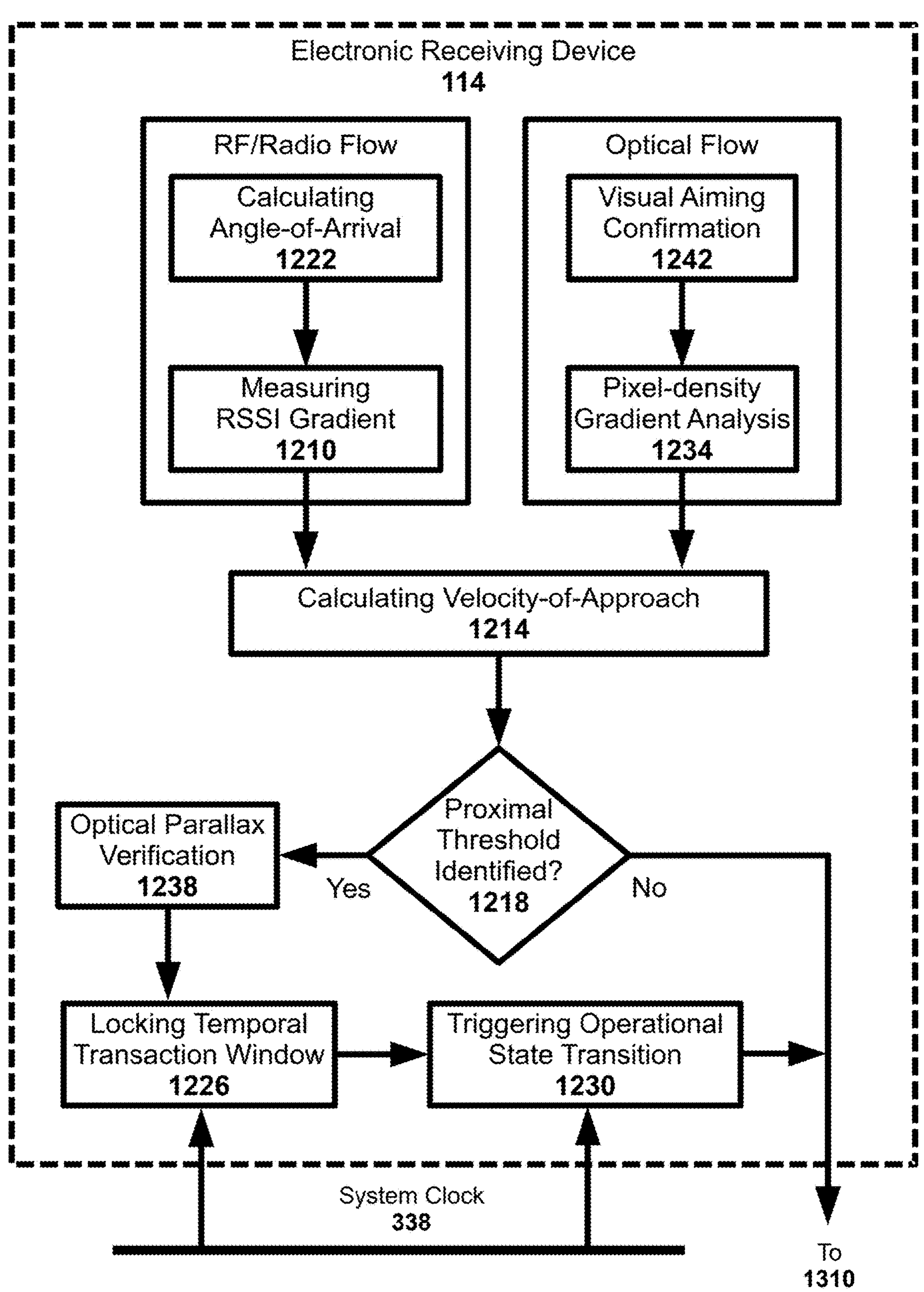
FIG. 12 is a functional block diagram illustrating spatial analytics, including pixel-density gradient analysis and optical parallax verification, in accordance with the present disclosure.

Referring to FIG. 12, a functional block diagram for Spatial Analytics is illustrated, representing the intent-based execution gating required to verify the physical legitimacy of a negotiation. This architecture is executed by the Electronic Receiving Device 114 (see FIG. 1) to ensure that an unprompted state modification is only triggered by an initiator with a verified physical trajectory and clear spatial intent.

The architecture includes Calculating Angle-of-Arrival 1222, where the Phased Antenna Array 514 (see FIG. 5) performs beam-steering and phase-difference analysis to verify the physical orientation of the Mobile Initiator 110. For optical embodiments, this is augmented by Visual Aiming Confirmation 1242, which centers the optical signal emitted by the Electronic Display 454 (see FIG. 4) within the receiver's field-of-view (FOV). These inputs feed into Measuring RSSI Gradient 1210 and Pixel-Density Gradient Analysis 1234. At block 1210, the system samples signal variations which are combined with the optical rate-of-change data from block 1234. At block 1234, the system determines proximity by calculating the rate of change in the optical pattern resolution as it is projected from the Electronic Display 454.

These spatial inputs are processed by Calculating Velocity-of-Approach 1214, which refines the initial velocity calculations of block 234 and utilizes a fusion of signal rate-of-change and UWB-based data from the UWB Module 526 to determine the closing speed of the initiator. This is compared against the Identifying Proximal Threshold? 1218 block. If the threshold is satisfied, the system engages Optical Parallax Verification 1238, where stereoscopic offset data from the Multi-element Optical Sensor 518 (see FIG. 5) is used to verify the three-dimensional depth of the initiator, effectively distinguishing the physical Electronic Display 454 from a two-dimensional fraudulent projection or relay.

Upon successful verification, the system executes Locking Temporal Transaction Window 1226, which establishes a cryptographically-bound time interval for the session validity in the Transient Session Buffer 822 (see FIG. 8). The architecture concludes with Triggering Operational State Transition 1230, the terminal action that releases the Ultimatum logic and initiates the state change based on verified spatial intent. This visual "Line-of-Sight" verification ensures the unprompted emission is only processed when the user is physically engaged with the terminal, passing high-fidelity telemetry to the Risk Scoring & Mitigation logic of FIG. 13.

In a practical "Coffee Shop Order-Ahead" application, the system uses the optical channel to solve the "Omnidirectional Noise" problem common in radio-frequency environments. As a user enters a crowded shop, the kiosk's camera utilizes Visual Aiming Confirmation 1242 to distinguish the user approaching the counter from other patrons whose devices may be emitting RF signals nearby. The system calculates the user's velocity via Pixel-Density Gradient Analysis 1234; if the user is merely walking past the kiosk, the Proximal Threshold 1218 remains closed. However, as the user intentionally "aims" their screen at the sensor and approaches the 1-meter zone, the rapid increase in angular resolution and Optical Parallax Verification 1238 confirm that the initiator is a physical device moving with clear transactional intent. These spatial measurements are passed as high-fidelity telemetry to the Risk Scoring & Mitigation logic of FIG. 13 to ensure the physical signal matches the expected cryptographic profile anchored by the System Clock 338.

Figure 13:
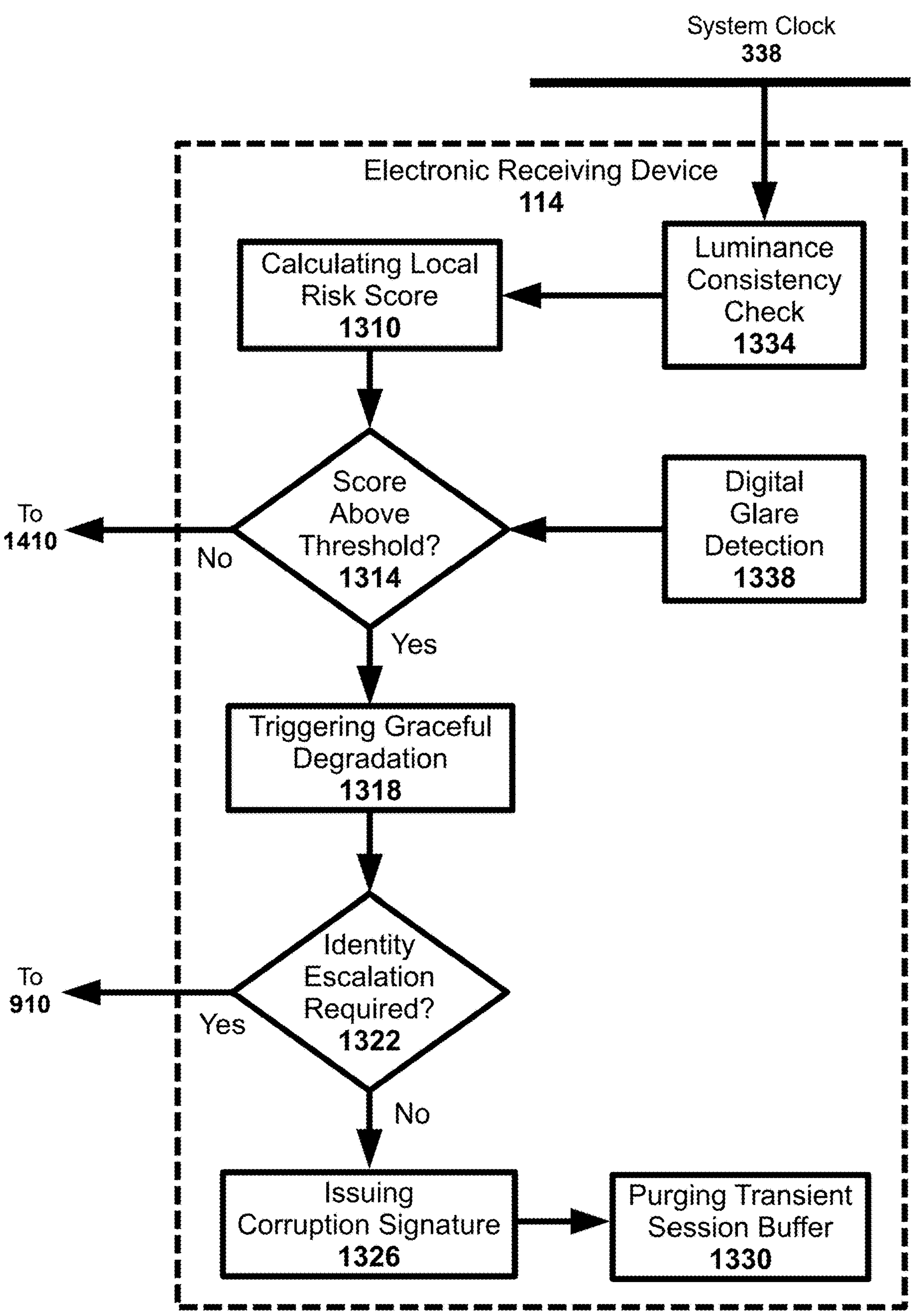
FIG. 13 is a logic flow diagram illustrating risk scoring, luminance consistency checks, and graceful degradation mitigation in accordance with the present disclosure.

Referring to FIG. 13, a logic flow for Risk Scoring & Mitigation is illustrated, representing the dynamic security layer used to evaluate the integrity of the unprompted interaction. This sequence is executed by the Electronic Receiving Device 114 (see FIG. 1) to facilitate the mitigation of sophisticated attack vectors, such as relay attacks or optical spoofing, before state finality.

The process initiates at step 1310, Calculating Local Risk Score, where the Machine-Learning Classifier 534 (see FIG. 5) aggregates telemetry from the Phased Antenna Array 514, the UWB Module 526, and the Multi-element Optical Sensor 518. The system performs a cross-correlation between the Measuring RSSI Gradient 1210, Time-of-Flight (ToF) data, and Pixel-Density Gradient Analysis 1234. In optical embodiments, the calculation at step 1310 is further informed by step 1334, Luminance Consistency Check, where the system verifies the refresh rate and temporal pulse of the detected signal against the Temporal Entropy Element 750 (see FIG. 7) using the System Clock 338. A discrepancy—such as a static optical pattern or a signal strength that does not match the angular resolution gradient—facilitates the generation of a high numerical risk value.

The logic proceeds to the decision gate at step 1314, Is the score above threshold?. This gate evaluates patterns identified at step 1338, Digital Glare Detection, where the system analyzes light-scatter patterns to differentiate between the glass-on-glass interaction of a physical smartphone and a high-resolution printed fraudulent display. If the score is within safe parameters (the "No" path), the logic advances to FIG. 14. If the score exceeds the safety threshold (the "Yes" path), the logic triggers step 1318, Triggering Graceful Degradation. In this mode, the Secure Processing Environment 314 (see FIG. 3) may apply a hardware-level restriction on the Settlement Instruction 1418, selectively limiting the transaction value or configuring the device to an offline-only reconciliation state.

Following degradation, the system executes step 1322, Requesting Identity Escalation?. If escalation is required (the "Yes" path), the logic leads to the identity escalation protocol of step 910 (see FIG. 9). If no escalation is requested or possible (the "No" path), the logic leads to step 1326, Issuing Corruption-signature. If the initiator provides a ZKP Token 918 via a non-flagged secondary channel, the system treats this as a multi-factor override, allowing the transaction to proceed to a limited degree despite the channel risk.

If escalation fails, or if Optical Parallax Verification 1238 suggests a non-physical source, the logic executes step 1330, Purging Transient Session Buffer, clearing cached attributes from the Transient Session Buffer 822 and the Secure Buffer 826. Additionally, at step 1326, the Secure Element Hardware Module 318 appends a session-bound "fail-state" bit-string to the Response Signal 122 to notify the initiator of the security termination.

In a practical application, such as a high-value payment terminal, if the system detects an unprompted QR code via step 1310 but determines through Luminance Consistency Check 1334 that the code is a static image (lacking the required temporal entropy refresh), the risk score is escalated. The terminal may utilize step 1322 to request an identity escalation; if the user's secure element provides a valid ZKP Token 918 via a simultaneous NFC or UWB handshake, the terminal may permit a "low-value" loyalty check-in while blocking the "high-value" payment settlement. This multi-layered evaluation protects the Ultimatum terms established via the User Interface 134 from both electromagnetic and optical interference.

Figure 14:
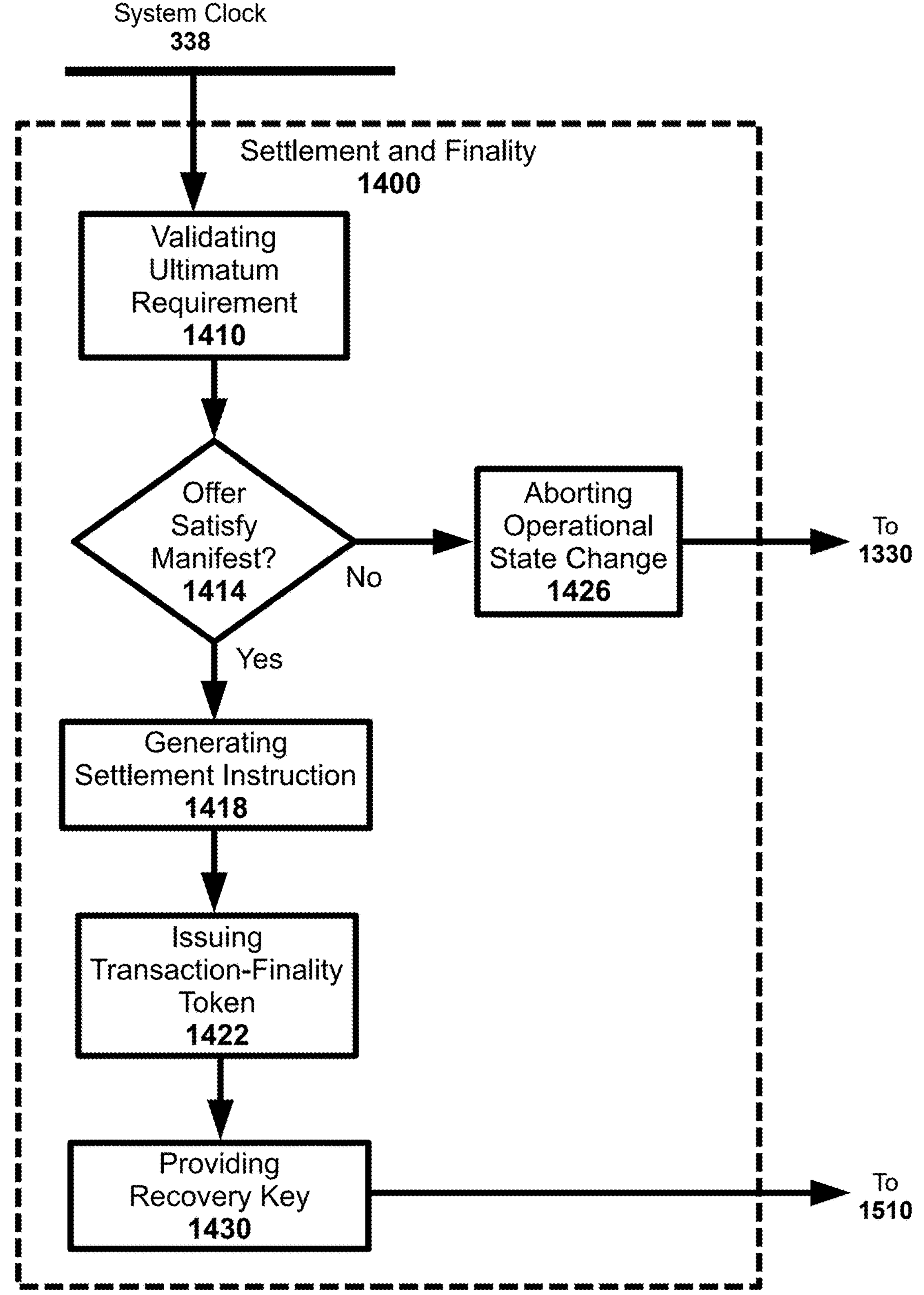
FIG. 14 is a logic flow diagram illustrating settlement & finality, including ultimatum validation and transaction-finality token generation, in accordance with the present disclosure.

Referring to FIG. 14, a logic flow for Settlement & Finality is illustrated, representing the transaction discharge sequence where the negotiated "Terms of Engagement" are executed. This sequence is governed by the Settlement & Finality 1400 parent container, facilitating a process where ledger-level modification is selectively executed based on the Mobile Initiator 110's ultimatums being satisfied and the spatial legitimacy from FIG. 12 being maintained.

Figure 16:
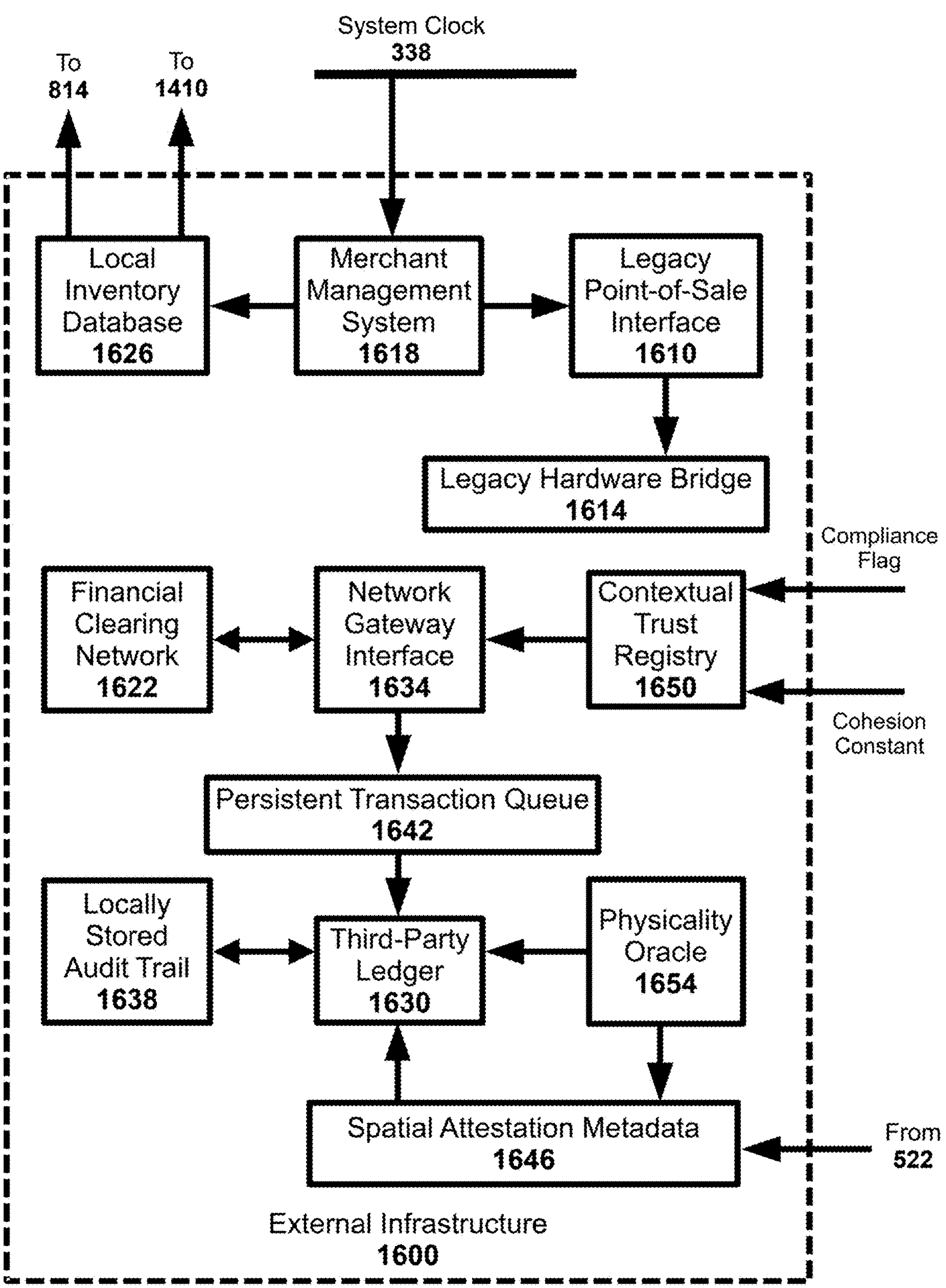
FIG. 16 is a functional block diagram illustrating the external infrastructure architecture, including the contextual trust registry and physicality oracle, in accordance with the present disclosure.

The sequence initiates at step 1410, Validating Ultimatum Requirement, where the Electronic Receiving Device 114 (see FIG. 1) executes a bit-wise comparison between the Ultimatum Flag 222 (see FIG. 2) and the real-time subtotal data retrieved from the Local Inventory Database 1626 (see FIG. 16). The hardware checks the mandatory 1-bit requirement established via the User Interface 134 against the merchant's available offers. Simultaneously, the system verifies the physical ultimatum: checking that the Pixel-Density Gradient Analysis 1234 remains above the execution threshold. This leads to the decision gate at step 1414, Does the offer satisfy manifest?, where the system determines if the transaction parameters fall within the scalar limits defined in the Negotiation Manifest 714 (see FIG. 7) and the Reconciliation Threshold 736.

If the conditions are not met (the "No" path), the logic proceeds to step 1426, Aborting Operational State Change, where the Active NFC Controller 426 (see FIG. 4) is configured to enter a "Passive-Listen" state, the Active Luminance Modulator 438 is attenuated to terminate the optical emission, and the logic leads to step 1330 to purge the session buffers. If the conditions are satisfied (the "Yes" path), the logic advances to step 1418, Generating Settlement Instruction. This digital command triggers the Secure Processing Environment 314 (see FIG. 3) to authorize a funds transfer via the Financial Clearing Network 1622 (see FIG. 16).

Upon a successful clearing signal, the logic executes step 1422, Issuing Transaction-Finality Token. This involves creating a cryptographically signed digital receipt anchored to the Unique Identifier (UUID) 718, providing the initiator with an immutable proof of discharge. Additionally, the system may execute step 1430, Providing Recovery Key, where a session restorer is generated from the Transient Session Buffer 822 and appended to the final Response Signal 122. This facilitates state recovery from the Persistent Transaction Queue 1642.

In a practical application, such as a "Visual-Checkout" kiosk, the terminal verifies the Ultimatum 1410 by confirming the pre-authorized discount established via the User Interface 134 was applied and that the user's device remains physically aimed at the sensor via Visual Aiming Confirmation 1242. If the parameters in the Attribute Reconciliation Table 738 are met, it fires the Settlement Instruction 1418. In an industrial context, this might take the form of the system verifying an "Access Attribute" and physically releasing a magnetic lock. Success in this terminal stage triggers the immediate Sensory Feedback mechanisms of FIG. 15, providing the user with directional haptic or visual confirmation of finality synchronized by the System Clock 338.

Figure 15:
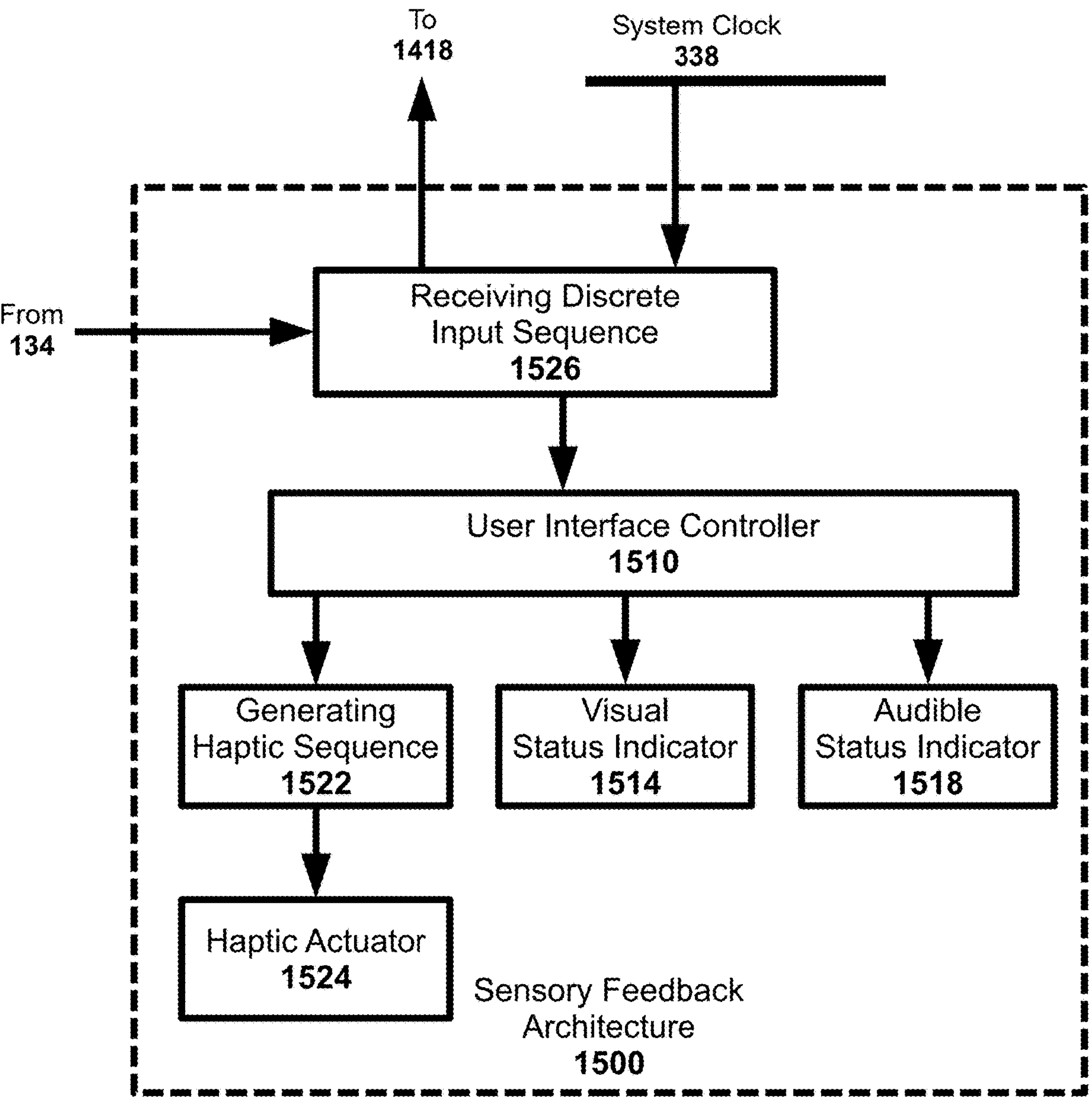
FIG. 15 is a functional block diagram illustrating the sensory feedback system, including the user interface controller and directional haptic sequences, in accordance with the present disclosure.

Referring to FIG. 15, a functional block diagram for Sensory Feedback Architecture 1500 is illustrated, representing the haptic, visual, and acoustic signaling used to guide the user through the unprompted negotiation process. This architecture is managed by a User Interface Controller 1510, which translates internal hardware state changes into real-time guidance and confirmation signals based on the parameters established via the User Interface 134 (see FIG. 1).

The architecture operates as a parallel background process during the spatial analytics of FIG. 12. The User Interface Controller 1510 manages Generating Haptic Sequence 1522, which utilizes the Calculating Angle-of-Arrival 1222 or the Visual Aiming Confirmation 1242 calculation to produce directional tactile pulses. This sequence leads to the Haptic Actuator 1524, which generates physical vibration patterns on the Mobile Initiator 110. This feedback loop, synchronized by the System Clock 338 (see FIG. 3), steers the user toward a specific physical threshold or optical alignment. Upon the Triggering Operational State Transition 1230, the controller activates a Visual Status Indicator 1514, signaling a "Spatial Lock" via the LED Array 434 (see FIG. 4) on the initiator-side or a graphical confirmation on the Electronic Receiving Device 114.

As the transaction reaches the settlement phase of FIG. 14, the architecture triggers the Audible Status Indicator 1518. This provides an acoustic pulse only after the Settlement Instruction 1418 has been successfully generated. If the risk scoring logic identifies a required user intervention, the system monitors for Receiving Discrete Input Sequence 1526. Here, the Primary Application Processor 310 monitors the device's inertial sensors or the User Interface 134 for a gesture, which instructs the Secure Element Hardware Module 318 (see FIG. 3) to authorize the Settlement Instruction 1418, serving as a manual, cryptographically-bound override for high-value "Ultimatums" as defined in the Attribute Reconciliation Table 738 (see FIG. 7).

In a practical "Secure Print Release" application, the system uses optical "Line-of-Sight" to solve the "Which Printer?" problem in dense environments. While radio signals (NFC/BLE) might trigger multiple units, the Visual Aiming Confirmation 1242 ensures that only the printer the user is physically facing can "see" the unprompted emission from the Electronic Display 454. At block 1522, the user's phone generates a specific directional vibration sequence via the Haptic Actuator 1524 once it confirms the optical handshake with "Printer B." As the user reaches the proximal threshold, the printer's visual indicator acknowledges the "Visual Lock," and the phone emits a short chime via the Audible Status Indicator 1518 to confirm the document has been released. This sensory alignment ensures that the physical-layer handshake remains transparently managed by the user's intent and the precise temporal gating of the System Clock 338.

Referring to FIG. 16, an External Infrastructure 1600 architecture is illustrated, representing the parent container for the network and bridge logic required to synchronize unprompted negotiations with a diverse commercial, social, and regulatory ecosystem. This architecture ensures that local hardware finality is translated into persistent, auditable records across external networks, anchored by the user's real-time physical and physiological state.

The primary hardware interface for legacy synchronization is the Legacy Point-of-Sale Interface 1610, which utilizes a Legacy Hardware Bridge 1614 to translate modern manifests into legacy-compatible bit-streams. To maintain session integrity during high-frequency optical updates, the Reconciliation Buffer 814 (see FIG. 8) serves as a temporal decoupler, isolating the real-time visual handshake from the slower processing cycle of the legacy bridge. For zero-latency local validation, a Merchant Management System 1618 updates a Local Inventory Database 1626, which feeds the Reconciliation Buffer 814 and the Reconciliation Threshold 736 directly, allowing the system to validate a mandatory requirement established via the User Interface 134 without cloud-query delays.

For specialized external execution, the architecture incorporates a Network Gateway Interface 1634 (functioning as a Payment Gateway or Industrial Bridge), which serves as a secure translator for a Financial Clearing Network 1622, an automotive V2X (Vehicle-to-Everything) Bridge, or a Building Automation Network. This interface is gated by a Contextual Trust Registry 1650, a hardware-accessible lookup service that verifies role-based or status-based credentials. The Contextual Trust Registry 1650 is configured to ingest a Regulatory Compliance Flag (e.g., for "No-Fly" zones) or a Multi-Node Cohesion Constant, which requires the Mobile Initiator 110 and a secondary wearable to be within a defined UWB-verified radius before the Network Gateway Interface 1634 facilitates a high-value settlement.

Upon settlement, the Transaction-Finality Token 1422 (see FIG. 14) is committed to a Locally-Stored Audit Trail 1638 and the Third-Party Ledger 1630 via a Persistent Transaction Queue 1642. This non-volatile buffer captures the output of the Network Gateway Interface 1634 and, in the event of a session interruption, utilizes the Providing Recovery Key 1430 to facilitate asynchronous state recovery. Crucially, the record includes Spatial Attestation Metadata 1646 to provide an immutable "Proof of Presence." To prevent digital-only spoofing or remote relay fraud, the system employs a Physicality Oracle 1654. This oracle is a hardware-software bridge configured to cross-verify the Spatial Attestation Metadata 1646 against telemetry from the Ambient Sensor 522 (Receiver-side) (e.g., PIR or LIDAR) to ensure the initiator's reported velocity and angle are physically and kinetically consistent with the receiver's physical environment.

In a practical "Contextual Agency" embodiment, the Negotiation Manifest 714 functions as a living state-machine modulated by a Body-Area Network (BAN). For example, if a wearable sensor detects a Physiological Entropy Shift—such as a sudden spike in heart rate or drop in skin temperature—the User Interface 134 issues a hardware interrupt to the Secure Processing Environment 314 to autonomously modulate the Merchant Priority Vector 742 or replace the Loyalty Identifier 722 with an Emergency SOS Token, which is then hashed with the Temporal Entropy Element 750 for auditable urgency.

In an "Automotive" context, this manifest includes a Sober-to-Drive status verified by the Contextual Trust Registry 1650; if the status is "Invalid," the Ultimatum Flag 222 issues a "Hardware Abort" to the vehicle's ignition interlock via the V2X Bridge. For "Social Discovery," the system performs a zero-knowledge match of a Transient Social Graph Hash. If a match is confirmed, the Machine-Learning Classifier 534 triggers a Directional Haptic Pattern 1514 only when Spatial Analytics 1210 confirm the users are physically aligned. Finally, in "Quiet Zones," the Ambient Sensor 126 may autonomously trigger a "Privacy Mode," forcing the Signal Output Interface 414 to switch to optical-only emission to prevent RF interference. This architecture ensures the "unprompted" process is fully integrated into the global safety, social, and financial fabric.

In one technical configuration, the mobile computing device or electronic receiving device utilizes a secure element hardware module physically isolated from a primary application processor to store a private cryptographic key. This secure architecture ensures the key never leaves the module, while a secure processing environment facilitates protected communication between third-party applications and the hardware for selecting data attributes. The generated data payload may be enhanced with temporal entropy elements, such as timestamps and nonce instances, which the processor regenerates at predetermined intervals alongside a new digital signature. To establish trust without a central authority, the public key may be linked to a digital certificate from a third-party attesting entity or function as a component of a decentralized identifier controlled directly by the mobile device. For privacy-sensitive interactions, the selectable data attribute can take the form of an anonymized token representing a persistent identity. This token is derived from a hash of a hierarchical entity identifier and a private root identity key, allowing for specific levels of persistence across a vendor's networked infrastructure, including subsidiary, location, or terminal identifiers.

Further security is provided through the use of zero-knowledge proof tokens, which allow the device to prove verifiable assertions to a receiver while sequestering the user's persistent identity. By binding a prior transactional seed from the secure element to the anonymized token, the system enables an external receiver to verify an entire identity chain via mathematical proof. In operation, the mobile device can be configured to broadcast this machine-readable signal persistently until it detects a handshake confirmation from a receiver. The attributes being broadcast are highly customizable and may be provisioned via an application programming interface to include user-environment preferences such as language settings, physical accessibility requirements, or dietary restrictions. Furthermore, these attributes can encompass service-level instructions like digital receipt delivery preferences or priority-tier access credentials. The device utilizes autonomous execution logic to manage these payloads using only locally-stored parameters and pre-validation checks against business rules, ensuring transactions are completed via direct proximity even when external networks are unavailable.

The system intelligently manages signal output by selecting attributes based on geographic location or by observing ambient environmental identifiers. To preserve power, the mobile device can initiate these transactions from a low-power sleep state using a dedicated low-energy controller or a magnetic field generator. This generator modulates the signal as an actively-generated unprompted magnetic field, sometimes employing active load modulation to synthesize waveforms that emulate a passive transponder. A specific preamble sequence may be included to trigger a mode transition in the receiving device from a polling state to a signal-capture state. To ensure session integrity, digital signatures may be short-lived and valid for only a single session, while randomized back-off timers prevent signal collisions between multiple proximate devices. Additionally, the signal can be encrypted using ephemeral session keys derived from local entropy and environmental metadata, ensuring that every interaction is computationally independent.

On the receiving end, the electronic device may employ a secure processing environment to verify incoming signals against a root-of-trust certificate or a revocation list. Atomic read-verify-execute operations are utilized to lock the public key and payload in a secure buffer, preventing exploits during the verification process. Upon successful verification, the receiver modifies its operational state, which may involve unlocking physical access points or adjusting environmental parameters like lighting, temperature, or audio output. The device maintains an immutable audit trail of these modifications and can implement signal strength thresholds to prioritize the strongest detected signal. During collision events, the receiver may enter a blanking state until a clear signal is isolated. For added reliability, the processor can require signal continuity for a minimum duration and calculate local risk scores to restrict privileges when operating offline.

The receiving device is also capable of maintaining a persistent transaction queue for asynchronous synchronization with a remote ledger once a network connection is restored. It can verify short-lived cryptographic proofs for pre-validated credit or identity status and process multiple attributes sequentially, such as applying a loyalty identifier before a payment token. To facilitate real-world commercial negotiation, the device includes a reconciliation buffer and an interface to an external merchant management system. This buffer is configured to dynamically generate a counter-offer by applying real-time inventory attributes, such as current stock levels or variable pricing logic retrieved from the external system, to the unified transaction manifest. This synthesis allows the device to output a response signal that reflects a negotiated state derived from the interaction between the mobile initiator's selectable data attributes and the merchant's live operational parameters. If a signal is interrupted or a session buffer expires, the device automatically reverts to its default monitoring state. In one configuration, the duration of this session buffer is adaptively governed by a velocity-of-approach model, ensuring the transient memory is purged if the physical trajectory of the initiator suggests a departure from the proximal zone.

Advanced detection interfaces may use phased antenna arrays or multi-element optical sensors to identify the spatial orientation of an initiator, restricting operations to specific directional zones. The system may further utilize the verified spatial orientation to drive sensory feedback mechanisms; for example, the processor may command a user interface controller to trigger a directional haptic sequence that guides the user toward a specific physical terminal based on the antenna array's calculated angle-of-arrival. The system may further utilize ultra-wideband ranging for precise distance measurements or monitor for optical trigger sequences to ensure physical presence. To handle large amounts of data, initiators can include signal-sequence numbers that allow the receiver to reconstruct fragmented payloads across multiple sampling intervals.

For hybrid environments, the receiving device can switch from a polling mode for passive targets to a dedicated monitoring mode for unprompted signals. It can identify transaction triggers by monitoring the power-draw signatures of nearby peripheral devices or use active self-interference cancellation to isolate unprompted signals from its own polling waveforms. This cancellation is achieved by sampling the device's local polling signal via a directional coupler and subtracting an inverted phase of that sample from the incoming signal path. Software-defined radio front-ends can digitally partition these states into distinct computational domains, while multi-core architectures ensure zero-latency concurrent processing. On the mobile side, the device transitions between operating states based on power-management profiles or the density of ambient beacons. By applying velocity-of-approach models to signal strength measurements, the device can proactively initiate a broadcast once it enters a defined proximity threshold. Finally, the hardware may include interference mitigation logic, adaptive notch filtering, and direct memory access controllers to ensure signal integrity and processing efficiency during concurrent transaction attempts.

In an alternative or concurrent technical configuration, the machine-readable signal is implemented as a spatially-modulated optical pattern output via a display of the mobile computing device. To ensure cryptographic integrity and prevent replay attacks within the visual domain, the processor may update this pattern as a sequence of machine-readable codes at a frequency dynamically synchronized with the temporal entropy element. Furthermore, the mobile device may utilize active luminance modulation, varying the brightness or chromatic output of the display to embed the data payload within a visual field detectable by an external receiver. On the receiving end, the detection interface utilizes an optical image sensor to identify and capture these unprompted optical emissions within a discrete image frame. The receiver's processor is configured to perform pixel-density gradient analysis on the captured frames, calculating the rate of change in the optical signal's footprint to determine a velocity-of-approach and physical proximity. To ensure transaction intent and prevent accidental triggers from ambient optical noise, the receiver calculates a spatial intent score based on the precise alignment and centering of the optical signal within the sensor's field-of-view. For high-utility or legacy-bridging environments, the system may operate in a cross-modal capacity, where the unprompted initiation occurs via an optical emission and the subsequent response signal is transmitted as a radio-frequency emission. To support these interactions alongside traditional contactless standards, the electronic receiving device maintains a persistent dual-state, utilizing dedicated computational domains to simultaneously monitor a radio-frequency front-end for magnetic load modulation and the optical sensor for machine-readable patterns.

Beyond the transactional embodiments described herein, the system architecture functions as a generalized framework for active-initiation environmental reconfiguration. In these expanded contexts, the electronic receiving device serves as an Environmental Logic Node configured to transition its physical or digital state in response to the unprompted, actively-synthesized broadcast from the mobile initiator. Unlike passive transponder systems (e.g., ISO/IEC 14443 or RFID) which require a localized interrogation field to wake a target, the mobile initiator herein utilizes internal power to proactive synthesize the negotiation manifest. This active initiation allows the mobile device to dictate the "terms of engagement" to stationary or mobile nodes before a mutual handshake is ever established.

In one technical deployment, the electronic receiving device is a Stationary Presence Node, such as an automated information kiosk, transit gateway, or industrial interface. Upon detecting the actively-generated manifest, the node's reconciliation buffer parses the constraint manifest to identify non-transactional operational instructions. For example, the node may automatically reconfigure a local user interface—adjusting display language, high-contrast visual modes, or audio amplitude—or release restricted metadata, such as directional guides or educational content, based on a verified "Intent-to-Engagement" flag within the payload. Because the mobile initiator actively pushes these attributes, the node is capable of pre-configuring its state at distances exceeding the standard coupling range of passive near-field systems.

Furthermore, the system facilitates Incentive-Based State Transitions where the node pushes digital value—such as access credentials, environment rebates, or cryptographically-signed activity tokens—to the mobile device in response to the broadcasted presence. This "Reverse-Value Flow" enables the system to operate as a proximity-based bounty or rebate engine, where the mobile device's active broadcast functions as a Portable Request for Proposal (RFP). The reconciliation buffer merges the user's published constraints with the node's local inventory or capability set to generate a finalized state change, such as the automated adjustment of climate control, lighting levels, or the unlocking of mechanical actuators in a smart-environment context.

Critically, the hardware-enforced Ultimatum Flag remains the primary logic-gate for these interactions. In non-transactional environments, the ultimatum flag serves as a Privacy-Barrier, instructing the node to purge the transient session buffer or suppress the transmission of a response signal unless a specific "Zero-Tracking" or "Anonymization" requirement is satisfied. This ensures that the environmental interaction remains a Privacy-Preserving Volitional Event, where the mobile device's active circuitry controls the depth of the digital footprint left in the physical space. By utilizing this active-initiation framework, the system provides a hardware-agnostic protocol for the seamless, unprompted alignment of user intent with environmental capability.

Having described the technical architecture and functional logic of the present disclosure in detail, it is intended that the scope of the disclosure be defined by the claims appended hereto, and that all modifications, equivalents, and variations that fall within the spirit and scope of the disclosure be included therein. The use of specific terminology and numbering is intended to provide clarity and does not preclude the application of the broadest reasonable interpretation of the elements as defined in the summary, the introductory definitions, and the specific embodiments described herein.

Although the disclosure has been shown and described with respect to certain aspects or embodiments, equivalent alterations and modifications will occur to others skilled in the art upon the reading and understanding of this specification and the annexed drawings. In particular regard to the various functions performed by the above-described items referred to by numerals (components, assemblies, modules, etc.), the terms (including a reference to a "means") used to describe such items are intended to correspond, unless otherwise indicated, to any item which performs the specified function of the described item (e.g., that is functionally equivalent), even though not structurally equivalent to any exemplary structure which performs the function in the herein illustrated exemplary aspects of the disclosure. Such items shall be understood to include any combination of hardware, firmware, or machine-executable instructions (software) configured to perform the recited functions.

In addition, while a particular feature of the disclosure may have been described above with respect to only one of several illustrated aspects, such feature may be combined with one or more other features of the other aspects, as may be desired and advantageous for any given or particular application. The use of the singular "a" or "an" is intended to include the plural "one or more" unless specifically stated otherwise.

The description herein with reference to the figures describes the present disclosure in sufficient detail to enable one skilled in the art to utilize the present disclosure in a variety of applications and devices. It will be readily apparent that various changes and modifications could be made therein without departing from the spirit and scope of the disclosure as defined in the following claims.

I claim:

1. A mobile computing device for autonomous transaction initiation, comprising:

a non-transitory memory storing a private cryptographic key and at least one selectable data attribute;

a processor configured to:

generate a data payload comprising the selectable data attribute and a public key associated with the private cryptographic key;

generate a digital signature via application of the private cryptographic key to the data payload; and command a signal output interface to output the data payload and the digital signature as a machine-readable signal;

wherein the machine-readable signal is initiated by the mobile computing device and is independent of any data-modulated signal received from an external receiver;

wherein the signal output interface is configured to output the machine-readable signal via at least one of a magnetic field generator configured to modulate the machine-readable signal as an actively-generated unprompted magnetic field and a display configured to output the machine-readable signal as a spatially-modulated optical pattern.

2. The device of claim 1, wherein the non-transitory memory comprises a secure element (SE) hardware module physically isolated from a primary application processor, wherein the private cryptographic key is stored within and never leaves the SE hardware module.

3. The device of claim 1, wherein the selectable data attribute comprises an anonymized token representing a persistent identity stored in a secure element of the non-transitory memory.

4. The device of claim 1, wherein the selectable data attribute specifies a user-environment preference, comprising at least one of a language preference, a physical accessibility requirement, and a dietary restriction flag and a service-level instruction, including at least one of a digital receipt delivery preference and a priority-tier access credential.

5. The device of claim 1, wherein the processor comprises autonomous execution logic to generate the data payload and command the signal output interface using only locally-stored parameters, ensuring the transaction is completed via direct proximity communication independent of external network availability.

6. The device of claim 1, further comprising a user interface configured to receive a discrete input sequence, wherein the processor is configured to respond to the discrete input sequence by contemporaneously selecting the at least one selectable data attribute and transitioning the signal output interface from a dormant state to an active broadcast state.

7. The device of claim 1, wherein the processor is configured to adjust a transmission power level of the signal output interface such that the machine-readable signal is detectable only within a defined proximity zone, ensuring the autonomous transaction initiation is limited to a localized physical environment.

8. An electronic receiving device for unprompted configuration, comprising:

a detection interface configured to monitor for an unprompted machine-readable signal containing a public key and at least one selectable data attribute;

a processor configured to:

verify the unprompted machine-readable signal via application of the public key; and modify an operational state of the electronic receiving device based on the selectable data attribute;

wherein the modification of the operational state is contingent upon the unprompted machine-readable signal and is independent of any data-modulated signal transmitted by the electronic receiving device to an external device;

wherein the detection interface comprises at least one of a phased antenna array and a multi-element optical sensor, and wherein the processor is configured to identify a spatial orientation of the external device relative to the detection interface to restrict the modification of the operational state to a specific directional zone.

9. The device of claim 8, wherein the modification of the operational state comprises unlocking a physical access point controlled by the electronic receiving device.

10. The device of claim 8, wherein the processor is configured to perform the verification of the unprompted machine-readable signal and the modification of the operational state while the electronic receiving device is independent of a connection to a remote authorization server.

11. The device of claim 8, wherein the processor is configured to sequentially apply a plurality of selectable data attributes, such that a first attribute representing a loyalty identifier is processed for a price calculation, and a second attribute representing a payment token is processed for a final settlement.

12. The device of claim 8, wherein the processor is configured to verify a digital signature encompassing both the public key and the at least one selectable data attribute, ensuring the attribute has not been altered relative to the public key.

13. The device of claim 8, wherein the at least one selectable data attribute comprises a cryptographic commitment of status, and wherein the processor is configured to verify the status without identifying the external device by validating said commitment against a trusted issuer key.

14. The device of claim 8, wherein the at least one selectable data attribute comprises an ultimatum flag, and wherein the processor is configured to abort the modification of the operational state if the electronic receiving device cannot satisfy a requirement associated with said ultimatum flag.

15. A system for unprompted commercial negotiation, comprising:

a mobile initiator and an electronic receiving device;

the mobile initiator comprising a signal output interface configured for initiation of an unprompted machine-readable signal comprising a public key, a selectable data attribute, and a unique identifier;

the electronic receiving device configured to:

verify the unprompted machine-readable signal via application of the public key;

modify an operational state based on the selectable data attribute; and transmit a response signal comprising a cryptographic binding to the unique identifier;

wherein the unprompted machine-readable signal is initiated by the mobile initiator independently of any data-modulated signal from the electronic receiving device.

16. The system of claim 15, wherein the electronic receiving device is configured to detect simultaneous unprompted machine-readable signals from a plurality of mobile initiators and to resolve signal contention by applying a proximity-weighting algorithm based on the unique identifier of each signal.

17. The system of claim 15, wherein the response signal further comprises a transaction-finality token, and wherein the mobile initiator is configured to store said token as an immutable digital receipt cryptographically linked to the unique identifier.

18. The system of claim 15, wherein the mobile initiator is configured to generate a finality-acknowledgment signal in response to the cryptographic binding, and wherein the electronic receiving device is configured to clear a session buffer and log the transaction as settled upon detection of said acknowledgment.

19. The system of claim 15, wherein the selectable data attribute comprises a negotiation manifest including an ultimatum flag, and wherein the electronic receiving device is configured to abort the modification of the operational state if a requirement of the ultimatum flag is not satisfied.

20. The system of claim 15, wherein the response signal comprises a counter-offer attribute, and wherein the mobile initiator is configured to perform a local comparison of the counter-offer attribute against a predefined scalar range stored in a non-transitory memory.

21. The system of claim 15, wherein the selectable data attribute includes a variable value seed, and wherein the electronic receiving device is configured to utilize the variable value seed to calculate a randomized discount value to be included in the response signal.

22. The system of claim 15, wherein the electronic receiving device further comprises an ambient sensor configured to detect a physical presence of a user associated with the mobile initiator, and wherein the verification of the unprompted machine-readable signal is gated by a concurrency requirement between the detection of the physical presence and the receipt of said signal.

23. The system of claim 15, wherein the electronic receiving device is configured to monitor for an optical trigger sequence emitted by the mobile initiator, and wherein the modification of the operational state is contingent upon a temporal alignment between the unprompted machine-readable signal and the optical trigger sequence.

24. An electronic receiving device for concurrent transaction processing, comprising:

a detection interface and a processor; the processor configured to:

maintain the detection interface in a persistent dual-state, the dual-state comprising a polling state and an unprompted signal detection state;

identify, via the unprompted signal detection state, an unprompted machine-readable signal containing a public key and at least one selectable data attribute;

verify the unprompted machine-readable signal via application of the public key; and modify an operational state of the electronic receiving device based on the at least one selectable data attribute;

wherein the polling state and the unprompted signal detection state are active concurrently;

wherein the detection interface comprises an antenna array configured for spatial multiplexing, enabling simultaneous reception of a response signal detected via the polling state and the unprompted machine-readable signal from different spatial vectors.

25. The device of claim 24, wherein the processor is configured to perform active self-interference cancellation by subtracting a known waveform of the polling state from a composite signal received at the detection interface to isolate the unprompted machine-readable signal.

26. The device of claim 24, wherein the processor comprises a multi-core architecture, and wherein the polling state is managed by a first core and the unprompted signal detection state is managed by a second core to ensure zero-latency concurrent processing.

27. The device of claim 24, wherein the dual-state comprises simultaneously monitoring a radio-frequency front-end for magnetic load modulation and an optical sensor for machine-readable patterns.

* * * * *